United States Patent
Shih et al.

(10) Patent No.: US 11,601,980 B2
(45) Date of Patent: Mar. 7, 2023

(54) METHOD AND APPARATUS FOR CARRIER SELECTION AND EARLY DATA TRANSMISSION (EDT) IN A WIRELESS COMMUNICATION SYSTEM

(71) Applicant: ASUSTek Computer Inc., Taipei (TW)

(72) Inventors: Tun-Huai Shih, Taipei (TW); Meng-Hui Ou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 28 days.

(21) Appl. No.: 16/909,425

(22) Filed: Jun. 23, 2020

(65) Prior Publication Data

US 2021/0014899 A1 Jan. 14, 2021

Related U.S. Application Data

(60) Provisional application No. 62/871,966, filed on Jul. 9, 2019.

(51) Int. Cl.
  *H04W 74/08* (2009.01)
  *H04B 17/318* (2015.01)

(52) U.S. Cl.
  CPC ...... *H04W 74/0833* (2013.01); *H04B 17/318* (2015.01)

(58) Field of Classification Search
  CPC .......... H04W 74/0833; H04W 74/0866; H04B 17/318
  See application file for complete search history.

(56) References Cited

U.S. PATENT DOCUMENTS

| 2019/0104553 A1 | 4/2019 | Johansson et al. | |
| 2019/0215749 A1* | 7/2019 | Shih | H04W 36/30 |
| 2019/0350034 A1* | 11/2019 | Choe | H04W 76/27 |
| 2020/0037345 A1 | 1/2020 | Ryoo et al. | |
| 2020/0146054 A1* | 5/2020 | Jeon | H04L 5/0053 |
| 2020/0187245 A1* | 6/2020 | Fujishiro | H04W 52/0229 |
| 2021/0315005 A1* | 10/2021 | Choe | H04W 74/04 |
| 2022/0159465 A1* | 5/2022 | Shrestha | H04W 12/0431 |

FOREIGN PATENT DOCUMENTS

| KR | 20180035719 A | 4/2018 | |
| WO | WO-2020263283 A1 * | 12/2020 | H04L 5/001 |

OTHER PUBLICATIONS

KIPO Office Action corresponding to Korean Application No. 10-2020-0076731, dated Aug. 30, 2022, 12 pages.
3GPP, TS38.321 v15.6.0—"Medium Access Control (MAC) protocol specification" (Release 15), Jun. 29, 2019, 3GPP server released, Valbonne, France, 75 pages.

* cited by examiner

*Primary Examiner* — Walli Z Butt
*Assistant Examiner* — Ryan C Kavleski
(74) *Attorney, Agent, or Firm* — Cooper Legal Group LLC

(57) ABSTRACT

A method and apparatus are disclosed. In an example from the perspective of a User Equipment (UE), the UE initiates a first Early Data Transmission (EDT) in RRC_INACTIVE state. Responsive to initiating the first EDT, the UE initiates a Random Access (RA) procedure in a cell configured with a normal uplink (NUL) carrier and a supplementary uplink (SUL) carrier. The UE selects the SUL carrier or the NUL carrier for performing the RA procedure based on at least one of whether there are one or more available Physical Random Access Channel (PRACH) resources for EDT on the SUL carrier or whether there are one or more available PRACH resources for EDT on the NUL carrier.

22 Claims, 12 Drawing Sheets

METHOD AND APPARATUS FOR CARRIER SELECTION AND EARLY DATA TRANSMISSION (EDT) IN A WIRELESS COMMUNICATION SYSTEM

CROSS-REFERENCE TO RELATED APPLICATIONS

The present Application claims the benefit of U.S. Provisional Patent Application Ser. No. 62/871,966 filed on Jul. 9, 2019, the entire disclosure of which is incorporated herein in its entirety by reference.

FIELD

This disclosure generally relates to wireless communication networks, and more particularly, to a method and apparatus for carrier selection and Early Data Transmission (EDT) in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE initiates a first Early Data Transmission (EDT) in RRC_INACTIVE state. Responsive to initiating the first EDT, the UE initiates a Random Access (RA) procedure in a cell configured with a normal uplink (NUL) carrier and a supplementary uplink (SUL) carrier. The UE selects the SUL carrier or the NUL carrier for performing the RA procedure based on at least one of whether there are one or more available Physical Random Access Channel (PRACH) resources for EDT on the SUL carrier or whether there are one or more available PRACH resources for EDT on the NUL carrier.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 36.300 V15.6.0, "E-UTRA and E-UTRAN, Overall description, Stage 2"; 3GPP TS 36.321 V15.6.0, "E-UTRA, MAC protocol specification"; 3GPP TS 36.331 V15.6.0, "E-UTRA, RRC protocol specification"; 3GPP TS 38.300 V15.6.0, "NR, NR and NG-RAN overall description, Stage 2"; 3GPP TS 38.321 V15.6.0, "NR, MAC protocol specification"; 3GPP TS 38.331 V15.6.0, "NR, RRC protocol specification". The standards and documents listed above are hereby expressly incorporated by reference in their entirety.

Figure 1:
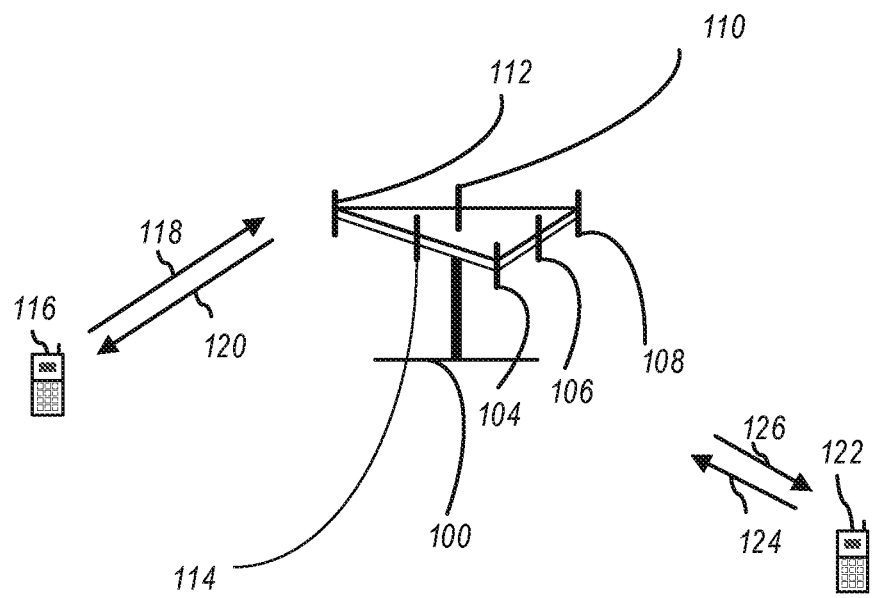
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
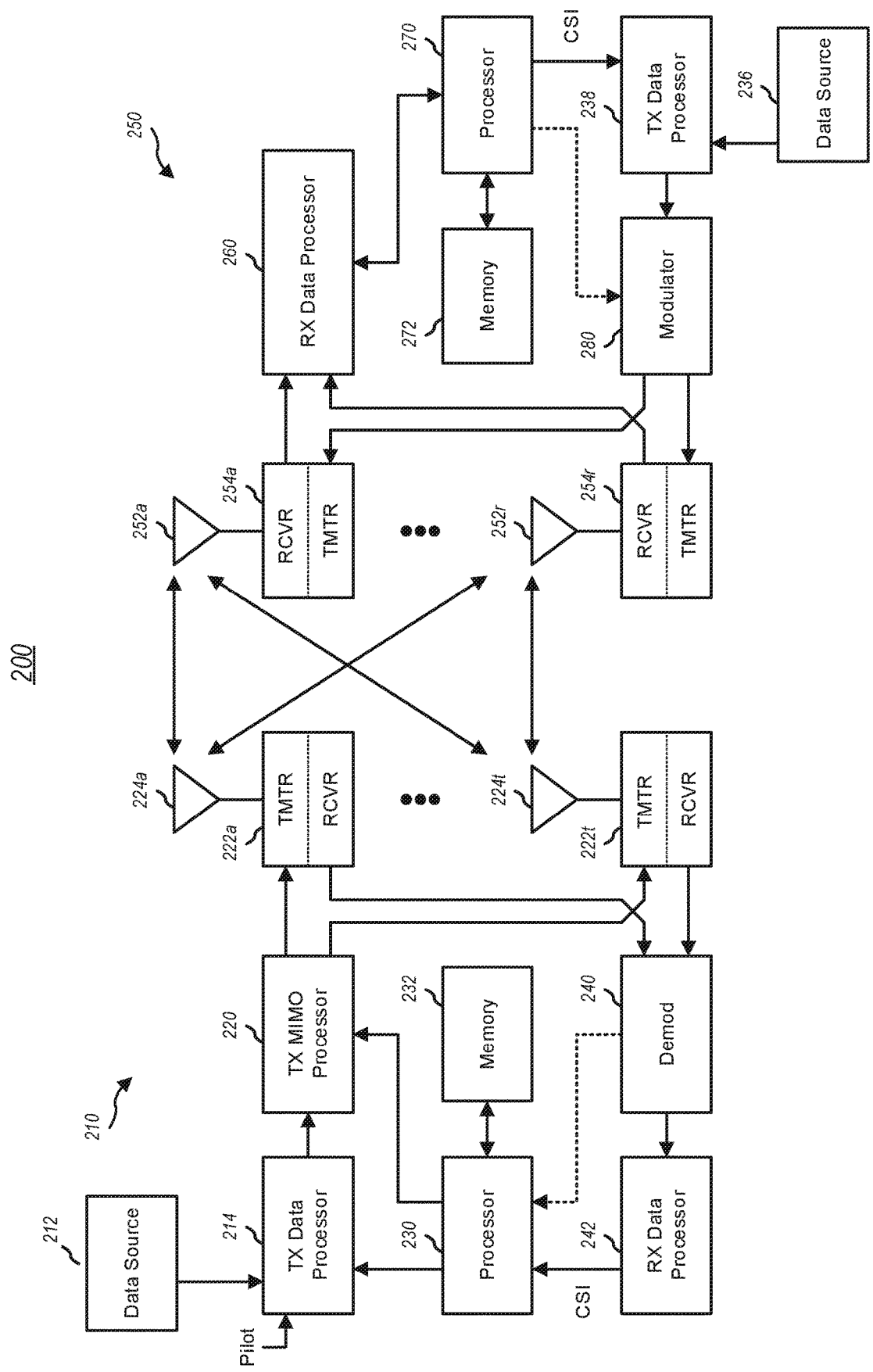
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which pre-coding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
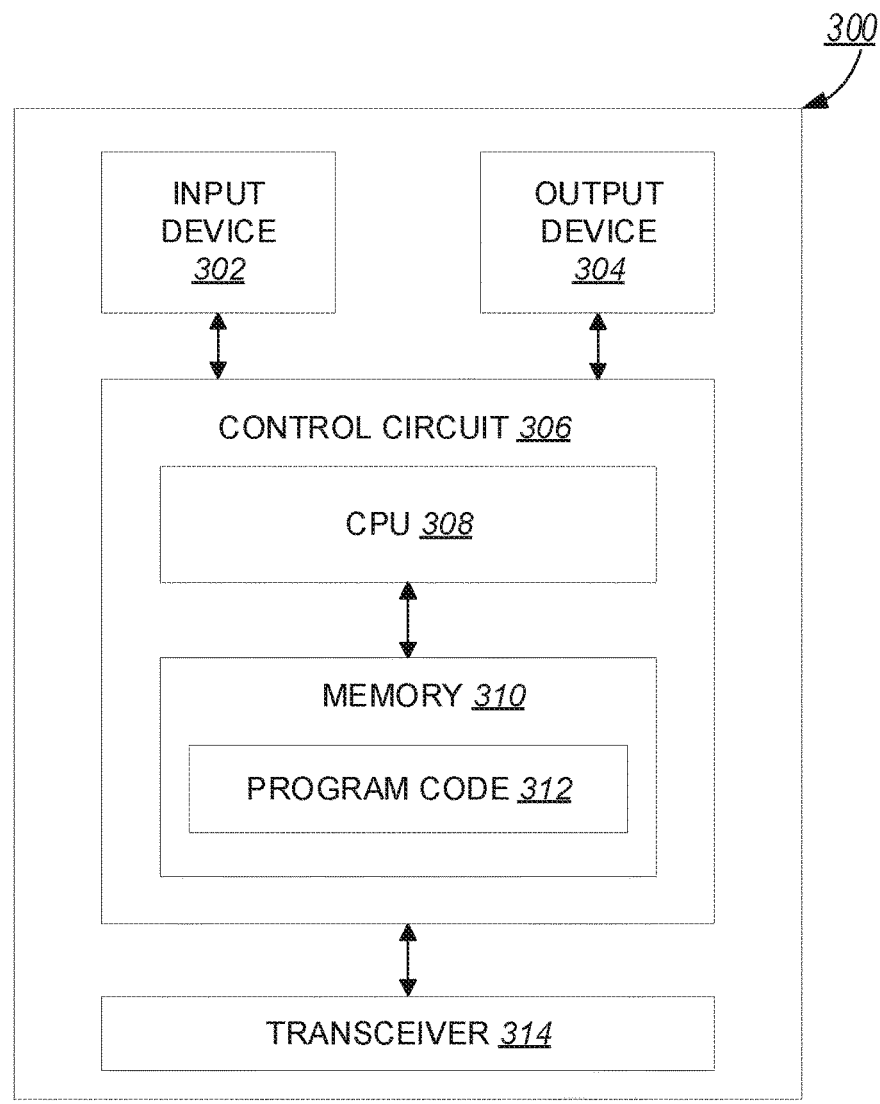
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
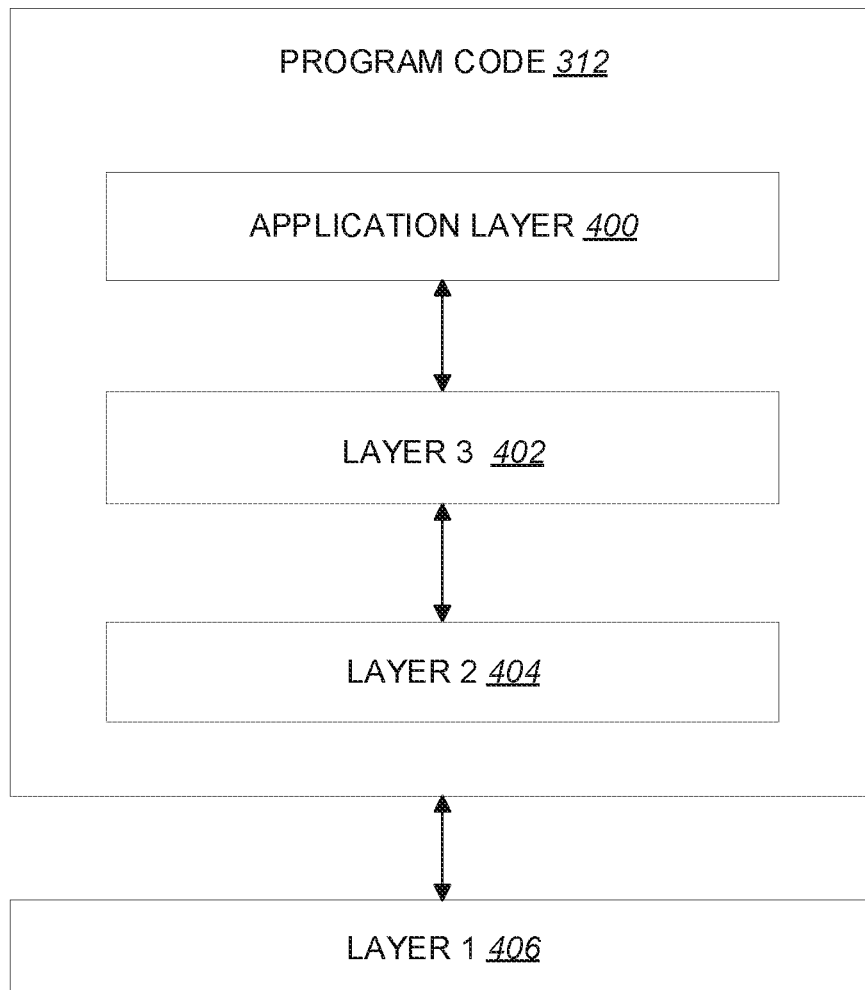
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

Figure 5:
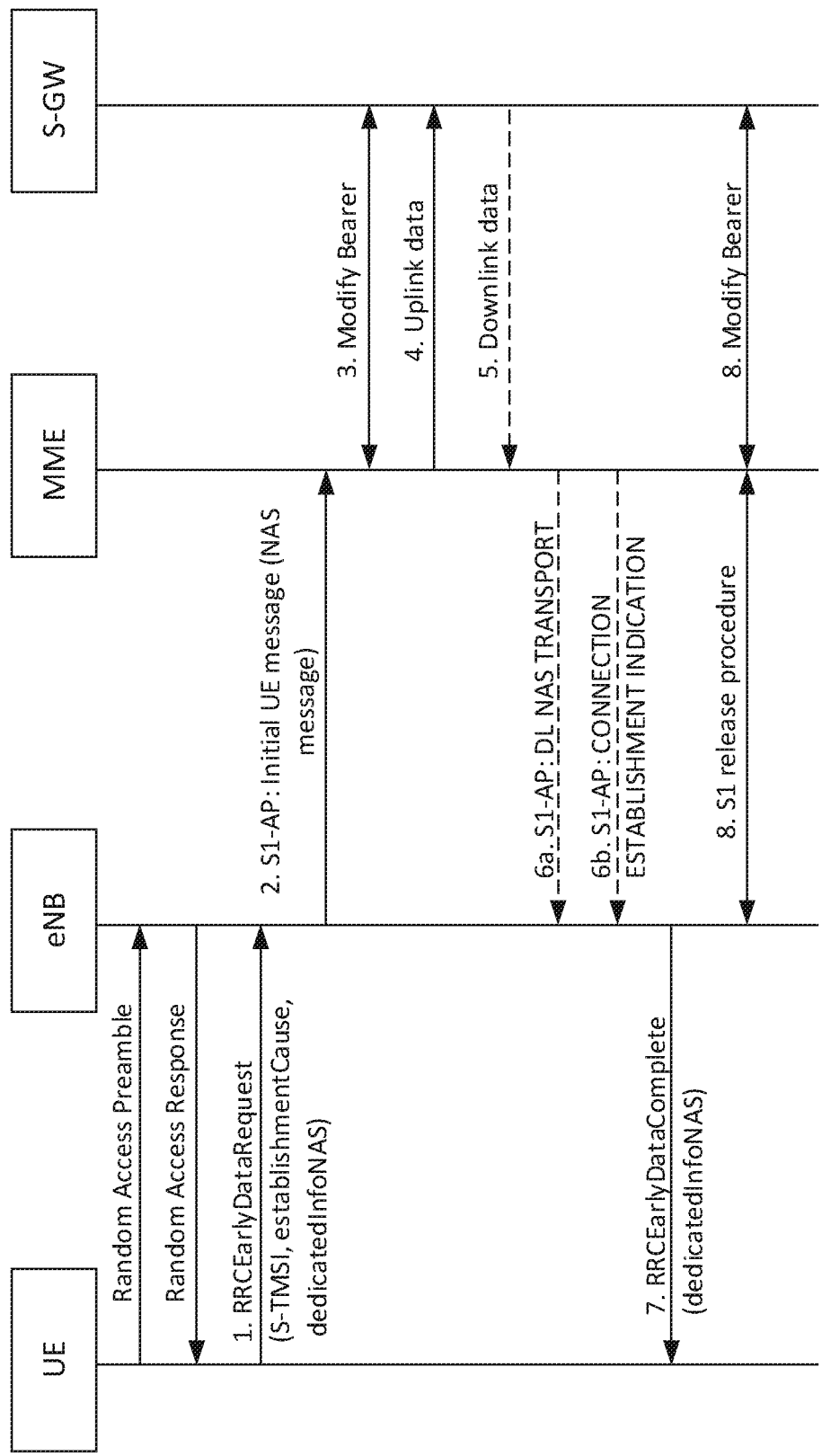
FIG. 5 is a diagram illustrating an exemplary scenario associated with Early Data Transmission (EDT) for Control Plane Cellular Internet of Things (CIoT) Evolved Packet System (EPS) optimizations according to one exemplary embodiment.
Figure 6:
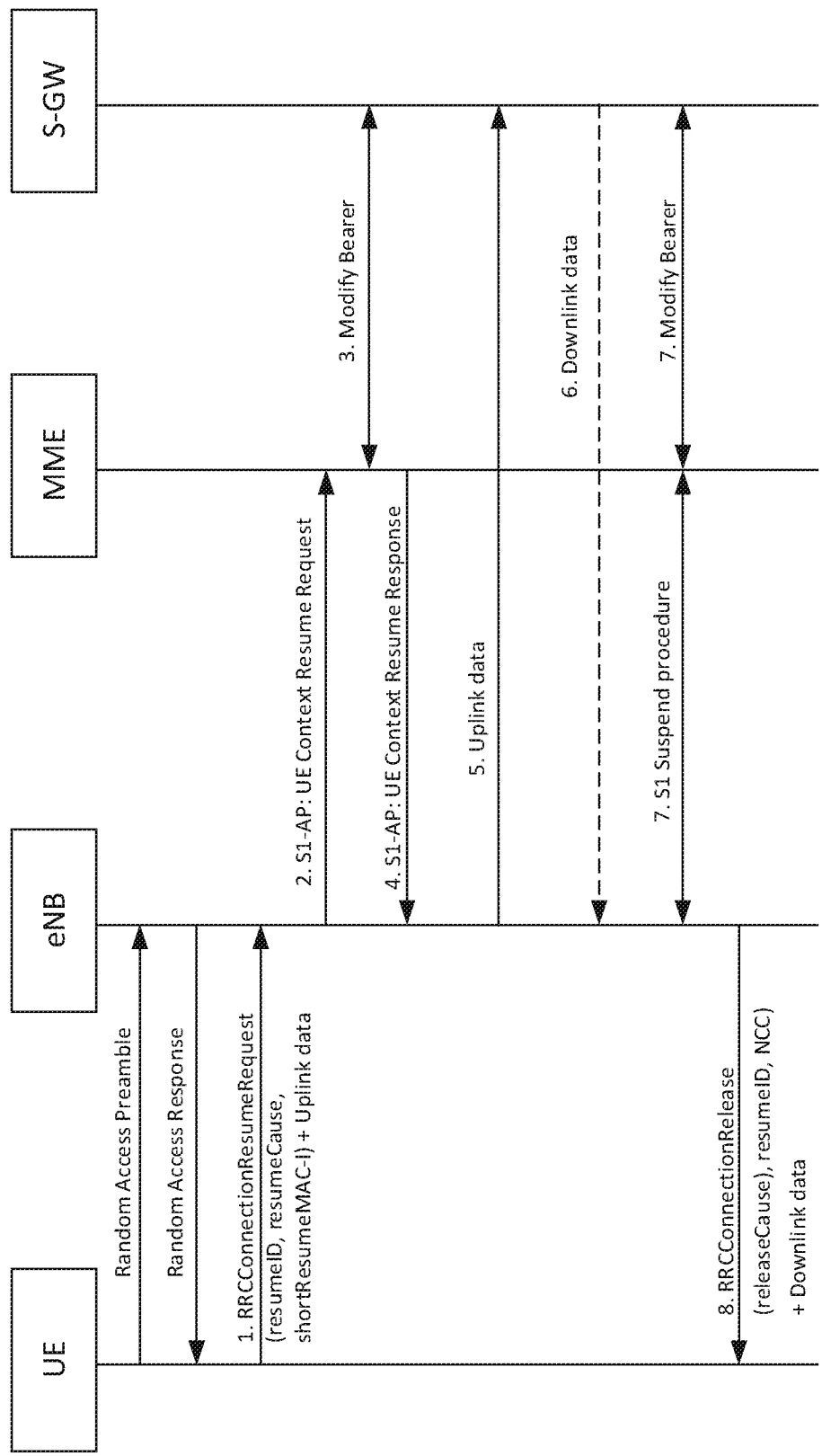
FIG. 6 is a diagram illustrating an exemplary scenario associated with EDT for User Plane CIoT EPS optimizations according to one exemplary embodiment.
Figure 7:
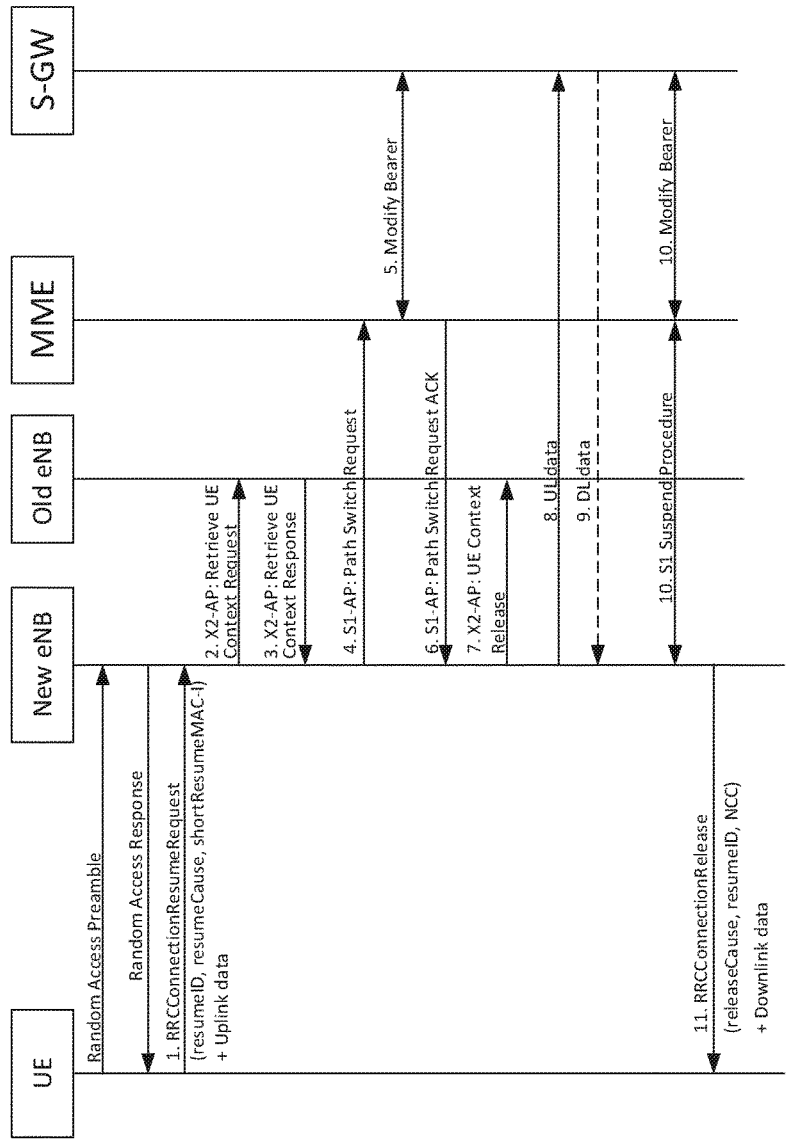
FIG. 7 is a diagram illustrating an exemplary scenario associated with EDT for User Plane CIoT EPS optimizations according to one exemplary embodiment.

Description related to Cellular Internet of Things (CIoT) signalling reduction optimizations and Early Data Transmission (EDT) in LTE is provided in 3GPP TS 36.300 V15.6.0. Notably, FIG. 7.3b-1 of Section 7.3b0.2 of 3GPP TS 36.300 V15.6.0, entitled "EDT for Control Plane CIoT EPS Optimizations", is reproduced herein as FIG. 5. FIG. 7.3b-2 of Section 7.3b.3 of 3GPP TS 36.300 V15.6.0, entitled "EDT for User Plane CIoT EPS Optimizations", is reproduced herein as FIG. 6. FIG. 7.3b-3 of Section 7.3b.3 of 3GPP TS 36.300 V15.6.0, entitled "EDT for User Plane CIoT EPS Optimizations in different eNB", is reproduced herein as FIG. 7. Parts of 3GPP TS 36.300 V15.6.0 are quoted below:

7.3b EDT
7.3b.1 General

EDT allows one uplink data transmission optionally followed by one downlink data transmission during the random access procedure.

EDT is triggered when the upper layers have requested the establishment or resumption of the RRC Connection for Mobile Originated data (i.e., not signalling or SMS) and the uplink data size is less than or equal to a TB size indicated in the system information. EDT is not used for data over the control plane when using the User Plane CIoT EPS optimizations.

EDT is only applicable to BL UEs, UEs in Enhanced Coverage and NB-IoT UEs.

7.3b.2 EDT for Control Plane CIoT EPS optimizations

EDT for Control Plane CIoT EPS optimizations, as defined in TS 24.301 [20], is characterized as below:

Uplink user data are transmitted in a NAS message concatenated in UL RRCEarlyDataRequest message on CCCH;

Downlink user data are optionally transmitted in a NAS message concatenated in DL RRCEarlyDataComplete message on CCCH;

There is no transition to RRC CONNECTED.

The EDT procedure for Control Plane CIoT EPS optimizations is illustrated in FIG. 7.3b-1.

FIG. 7.3b-1: EDT for Control Plane CIoT EPS Optimizations

0. Upon connection establishment request for Mobile Originated data from the upper layers, the UE initiates the early data transmission procedure and selects a random access preamble configured for EDT.

1. UE sends RRCEarlyDataRequest message concatenating the user data on CCCH.

2. The eNB initiates the S1-AP Initial UE message procedure to forward the NAS message and establish the S1 connection. The eNB may indicate in this procedure that this connection is triggered for EDT.

3. The MME requests the S-GW to re-activate the EPS bearers for the UE.

4. The MME sends the uplink data to the S-GW.

5. If downlink data are available, the S-GW sends the downlink data to the MME.

6. If downlink data are received from the S-GW, the MME forwards the data to the eNB via DL NAS Transport procedure and may also indicate whether further data are expected. Otherwise, the MME may trigger Connection Establishment Indication procedure and also indicate whether further data are expected.

7. If no further data are expected, the eNB can send the RRCEarlyDataComplete message on CCCH to keep the UE in RRC_IDLE. If downlink data were received in step 6, they are concatenated in RRCEarlyDataComplete message.

8. The S1 connection is released and the EPS bearers are deactivated.

NOTE 1: If the MME or the eNB decides to move the UE in RRC_CONNECTED mode, RRCConnectionSetup message is sent in step 7 to fall back to the legacy RRC Connection establishment procedure; the eNB will discard the zero-length NAS PDU received inRRCConnectionSetupComplete message.

NOTE 2: If neither RRCEarlyDataComplete nor, in case of fallback, RRCConnectionSetup is received in response to RRCEarlyDataRequest, the UE considers the UL data transmission not successful.

7.3b.3 EDT for User Plane CIoT EPS Optimizations

EDT for User Plane CIoT EPS optimizations, as defined in TS 24.301 [20], is characterized as below:

The UE has been provided with a NextHopChainingCount in the RRCConnectionRelease message with suspend indication;

Uplink user data are transmitted on DTCH multiplexed with UL RRCConnectionResumeRequest message on CCCH;

Downlink user data are optionally transmitted on DTCH multiplexed with DL RRCConnectionRelease message on DCCH;

The short resume MAC-I is reused as the authentication token for RRCConnectionResumeRequest message and is calculated using the integrity key from the previous connection;

The user data in uplink and downlink are ciphered. The keys are derived using the NextHopChainingCount provided in the RRCConnectionRelease message of the previous RRC connection;

The RRCConnectionRelease message is integrity protected and ciphered using the newly derived keys;

There is no transition to RRC CONNECTED.

The EDT procedure for User Plane CIoT EPS optimizations is illustrated in FIG. 7.3b-2.

FIG. 7.3b-2: EDT for User Plane CIoT EPS Optimizations

0. Upon connection resumption request for Mobile Originated data from the upper layers, the UE initiates the early data transmission procedure and selects a random access preamble configured for EDT.

1. The UE sends an RRCConnectionResumeRequest to the eNB, including its Resume ID, the establishment cause, and an authentication token. The UE resumes all SRBs and DRBs, derives new security keys using the NextHopChainingCount provided in the RRCConnectionRelease message of the previous connection and re-establishes the AS security. The user data are ciphered and transmitted on DTCH multiplexed with the RRCConnectionResumeRequest message on CCCH.

2. The eNB initiates the S1-AP Context Resume procedure to resume the S1 connection and re-activate the S1-U bearers.
3. The MME requests the S-GW to re-activate the S1-U bearers for the UE.
4. The MME confirms the UE context resumption to the eNB.
5. The uplink data are delivered to the S-GW.
6. If downlink data are available, the S-GW sends the downlink data to the eNB.
7. If no further data are expected from the S-GW, the eNB can initiate the suspension of the S1 connection and the deactivation of the S1-U bearers.
8. The eNB sends the RRCConnectionRelease message to keep the UE in RRC_IDLE. The message includes the release Cause set to rrc-Suspend, the resumeID, the NextHopChainingCount and drb-ContinueROHC which are stored by the UE. If downlink data were received in step 6, they are sent ciphered on DTCH multiplexed with the RRCConnectionRelease message on DCCH.
NOTE 1: If the MME or eNB decides the UE to move in RRC_CONNECTED mode,
   RRCConnectionResume message is sent in step 7 to fall back to the RRC Connection resume procedure. In that case, the RRCConnectionResume message is integrity protected and ciphered with the keys derived in step 1 and the UE ignores the NextHopChainingCount included in the RRCConnectionResume message. Downlink data can be transmitted on DTCH multiplexed with the RRCConnectionResume message. In addition, an RRCConnectionSetup can also be sent in step 7 to fall back to the RRC Connection establishment procedure.
NOTE 2: If neither RRCConnectionRelease nor, in case of fallback, RRCConnectionResume is received in response to RRCConnectionResumeRequest for EDT, the UE considers the UL data transmission not successful.

For EDT for User Plane CIoT EPS Optimizations, an RRC connection can also be resumed in an eNB (the new eNB) different from the one where the connection was suspended (the old eNB). Inter eNB connection resumption is handled using context fetching, whereby the new eNB retrieves the UE context from the old eNB over the X2 interface. The new eNB provides the Resume ID which is used by the old eNB to identify the UE context. This is illustrated in FIG. 7.3b-3.

Figure: 7.3b-3: EDT for User Plane CIoT EPS Optimizations in different eNB

1. Same as step 1 in the intra eNB connection resumption.
2. The new eNB locates the old eNB using the Resume ID and retrieves the UE context by means of the X2-AP Retrieve UE Context procedure.
3. The old eNB responds with the UE context associated with the Resume ID.
4. The new eNB initiates the S1-AP Path Switch procedure to establish a S1 UE associated signalling connection to the serving MME and to request the MME to resume the UE context.
5. The MME requests the S-GW to activate the S1-U bearers for the UE and updates the downlink path.
6. MME Acks step 5.
7. After the S1-AP Path Switch procedure the new eNB triggers release of the UE context at the old eNB by means of the X2-AP UE Context Release procedure.
8. Same as step 5 in the intra eNB connection resumption.
9. Same as step 6 in the intra eNB connection resumption.
10. Same as step 7 in the intra eNB connection resumption.
11. Same as step 8 in the intra eNB connection resumption.

Description related to Random Access procedure in LTE is quoted below from 3GPP TS 36.321 V15.6.0.
5.1 Random Access Procedure
5.1.2 Random Access Resource Selection
The Random Access Resource selection procedure shall be performed as follows:
   for BL UEs or UEs in enhanced coverage or NB-IoT UEs, if EDT is initiated by the upper layers:
      if the message size (UL data available for transmission plus MAC header and, where required, MAC control elements) is larger than the TB size signalled in edt-TBS for the selected enhanced coverage level for EDT; or
      if the PRACH resource associated with EDT for the selected enhanced coverage level is not available:
         indicate to upper layers that EDT is cancelled;
   for BL UEs or UEs in enhanced coverage, select the PRACH resource set corresponding to the selected enhanced coverage level. For EDT, the PRACH resource set shall correspond to the set associated with EDT for the selected enhanced coverage level.
   if, except for NB-IoT, ra-PreambleIndex (Random Access Preamble) and ra-PRACH-MaskIndex (PRACH Mask Index) have been explicitly signalled and ra-PreambleIndex is not 000000:
      the Random Access Preamble and the PRACH Mask Index are those explicitly signalled;
   else if, for NB-IoT, ra-PreambleIndex (Random Access Preamble) and PRACH resource have been explicitly signalled:
      the PRACH resource is that explicitly signalled;
      if the ra-PreambleIndex signalled is not 000000:
         if ra-CFRA-Config is configured:
            the Random Access Preamble is set to nprach-SubcarrierOffset+nprach-NumCBRA-StartSubcarriers+(ra-PreambleIndex modulo (nprach-NumSubcarriers−nprach-NumCBRA-StartSubcarriers)), where nprach-SubcarrierOffset, nprach-NumCBRA-StartSubcarriers and nprach-NumSubcarriers are parameters in the currently used PRACH resource.
         else:
            the Random Access Preamble is set to nprach-SubcarrierOffset+(ra-PreambleIndex modulo nprach-NumSubcarriers), where nprach-SubcarrierOffset and nprach-NumSubcarriers are parameters in the currently used PRACH resource.
      else:
         select the Random Access Preamble group according to the PRACH resource and the support for multi-tone Msg3 transmission. A UE supporting multi-tone Msg3 shall only select the single-tone Msg3 Random Access Preambles group if there is no multi-tone Msg3 Random Access Preambles group.
         randomly select a Random Access Preamble within the selected group.
   else the Random Access Preamble shall be selected by the MAC entity as follows:
      if the UE is a BL UE or UE in enhanced coverage and EDT is initiated:

select the Random Access Preambles group corresponding to PRACH resource for EDT for the selected enhanced coverage level.
  else if the UE is a BL UE or UE in enhanced coverage and Random Access Preamble group B does not exist:
    select the Random Access Preambles group corresponding to the selected enhanced coverage level.
  else if the UE is an NB-IoT UE:
    randomly select one of the PRACH resources corresponding to the selected enhanced coverage level according to the configured probability distribution, and select the Random Access Preambles group corresponding to the PRACH resource and the support for multi-tone Msg3 transmission. A UE supporting multi-tone Msg3 shall only select the single-tone Msg3 Random Access Preambles group if there is no multi-tone Msg3 Random Access Preambles group. For EDT, the PRACH resource shall correspond to resource associated with EDT for the selected enhanced coverage level.
  else if Msg3 has not yet been transmitted, the MAC entity shall:
    if Random Access Preambles group B exists and any of the following events occur:
      the potential message size (UL data available for transmission plus MAC header and, where required, MAC control elements) is greater than messageSizeGroupA and the pathloss is less than $P_{CMAX,c}$ (of the Serving Cell performing the Random Access Procedure)−preambleinitialReceivedTargetPower−deltaPreambleMsg3−messagePowerOffsetGroupB;
      the Random Access procedure was initiated for the CCCH logical channel and the CCCH SDU size plus MAC header is greater than messageSizeGroupA;
        select the Random Access Preambles group B;
    else:
      select the Random Access Preambles group A.
  else, if Msg3 is being retransmitted, the MAC entity shall:
    select the same group of Random Access Preambles as was used for the preamble transmission attempt corresponding to the first transmission of Msg3.
  randomly select a Random Access Preamble within the selected group. The random function shall be such that each of the allowed selections can be chosen with equal probability;
  except for NB-IoT, set PRACH Mask Index to 0.
determine the next available subframe containing PRACH permitted by the restrictions given by the prach-ConfigIndex (except for NB-IoT), the PRACH Mask Index (except for NB-IoT, see clause 7.3), physical layer timing requirements, as specified in TS 36.213 [2], and in case of NB-IoT, the subframes occupied by PRACH resources related to a higher enhanced coverage level (a MAC entity may take into account the possible occurrence of measurement gaps when determining the next available PRACH subframe);
except for NB-IoT:
  if the transmission mode is TDD and the PRACH Mask Index is equal to zero:
    if ra-PreambleIndex was explicitly signalled and it was not 000000 (i.e., not selected by MAC):
      randomly select, with equal probability, one PRACH from the PRACHs available in the determined subframe.
    else:
      randomly select, with equal probability, one PRACH from the PRACHs available in the determined subframe and the next two consecutive subframes.
  else:
    determine a PRACH within the determined subframe in accordance with the requirements of the PRACH Mask Index, if any.
  for NB-IoT UEs, BL UEs or UEs in enhanced coverage, select the ra-ResponseWindowSize and mac-ContentionResolutionTimer corresponding to the selected enhanced coverage level and PRACH.
  proceed to the transmission of the Random Access Preamble (see clause 5.1.3).
5.1.4 Random Access Response Reception
  The MAC entity may stop monitoring for Random Access Response(s) after successful reception of a Random Access Response containing Random Access Preamble identifiers that matches the transmitted Random Access Preamble.
  If a downlink assignment for this TTI has been received on the PDCCH for the RA-RNTI and the received TB is successfully decoded, the MAC entity shall regardless of the possible occurrence of a measurement gap or a Sidelink Discovery Gap for Transmission or a Sidelink Discovery Gap for Reception, and regardless of the prioritization of V2X sidelink communication described in clause 5.14.1.2.2:
    if the Random Access Response contains a Backoff Indicator subheader:
      set the backoff parameter value as indicated by the BI field of the Backoff Indicator subheader and Table 7.2-1, except for NB-IoT where the value from_Table 7.2-2 is used.
    else, set the backoff parameter value to 0 ms.
    if the Random Access Response contains a Random Access Preamble identifier corresponding to the transmitted Random Access Preamble (see clause 5.1.3), the MAC entity shall:
      consider this Random Access Response reception successful and apply the following actions for the serving cell where the Random Access Preamble was transmitted:
      process the received Timing Advance Command (see clause 5.2);
      indicate the preambleinitialReceivedTargetPower and the amount of power ramping applied to the latest preamble transmission to lower layers (i.e., (PREAMBLE_TRANSMISSION_COUNTER−1)*powerRampingStep);
      if the SCell is configured with ul-Configuration-r14, ignore the received UL grant otherwise process the received UL grant value and indicate it to the lower layers;
      if, except for NB-IoT, ra-PreambleIndex was explicitly signalled and it was not 000000 (i.e., not selected by MAC):
        consider the Random Access procedure successfully completed.
      else if, the UE is an NB-IoT UE, ra-PreambleIndex was explicitly signalled and it was not 000000 (i.e., not selected by MAC) and ra-CFRA-Config is configured:
        consider the Random Access procedure successfully completed.

the UL grant provided in the Random Access Response message is valid only for the configured carrier (i.e. UL carrier used prior to this Random Access procedure).
else:
if the Random Access Preamble was selected by the MAC entity; or
if the UE is an NB-IoT UE, the ra-Preambleindex was explicitly signalled and it was not 000000 and ra-CFRA-Config is not configured:
set the Temporary C-RNTI to the value received in the Random Access Response message no later than at the time of the first transmission corresponding to the UL grant provided in the Random Access Response message;
if the Random Access Preamble associated with EDT was transmitted and UL grant provided in the Random Access Response message is not for EDT:
indicate to upper layers that EDT is cancelled due to UL grant not being for EDT;
for CP-EDT, flush the Msg3 buffer.
for UP-EDT, update the MAC PDU in the Msg3 buffer in accordance with the uplink grant received in the Random Access Response.
if the Random Access Preamble associated with EDT was transmitted, the UL grant was received in a Random Access Response for EDT, and there is a MAC PDU in the Msg3 buffer:
if the TB size according to edt-SmallTBS-Enabled and as described in clause 8.6.2 and 16.3.3 of TS 36.213 [2] does not match the size of the MAC PDU in the Msg3 buffer:
the MAC entity shall update the MAC PDU in the Msg3 buffer in accordance with the TB size.
if this is the first successfully received Random Access Response within this Random Access procedure; or
if CP-EDT is cancelled due to the UL grant provided in the Random Access Response message not being for EDT:
if the transmission is not being made for the CCCH logical channel, indicate to the Multiplexing and assembly entity to include a C-RNTI MAC control element in the subsequent uplink transmission;
obtain the MAC PDU to transmit from the "Multiplexing and assembly" entity and store it in the Msg3 buffer.
NOTE 1: When an uplink transmission is required, e.g., for contention resolution, the eNB should not provide a grant smaller than 56 bits (or 88 bits for NB-IoT) in the Random Access Response.
NOTE 2: If within a Random Access procedure, an uplink grant provided in the Random Access Response for the same group of Random Access Preambles has a different size than the first uplink grant allocated during that Random Access procedure, the UE behavior is not defined except for EDT.

Description related to Random Access procedure in NR is quoted below from 3GPP TS 38.321 V15.6.0.
5.1 Random Access Procedure
5.1.1 Random Access Procedure Initialization
The Random Access procedure described in this clause is initiated by a PDCCH order, by the MAC entity itself, or by RRC for the events in accordance with TS 38.300 [2]. There is only one Random Access procedure ongoing at any point in time in a MAC entity. The Random Access procedure on an SCell shall only be initiated by a PDCCH order with ra-PreambleIndex different from 0b000000.
NOTE 1: If a new Random Access procedure is triggered while another is already ongoing in the MAC entity, it is up to UE implementation whether to continue with the ongoing procedure or start with the new procedure (e.g. for SI request).
RRC configures the following parameters for the Random Access procedure:
prach-ConfigurationIndex: the available set of PRACH occasions for the transmission of the Random Access Preamble;
preambleReceivedTargetPower: initial Random Access Preamble power;
rsrp-ThresholdSSB: an RSRP threshold for the selection of the SSB. If the Random Access procedure is initiated for beam failure recovery, rsrp-ThresholdSSB used for the selection of the SSB within candidateBeamRSList refers to rsrp-ThresholdSSB in BeamFailureRecoveryConfig IE;
rsrp-ThresholdCSI-RS: an RSRP threshold for the selection of CSI-RS. If the Random Access procedure is initiated for beam failure recovery, rsrp-ThresholdCSI-RS is equal to rsrp-ThresholdSSB in BeamFailureRecoveryConfig IE;
rsrp-ThresholdSSB-SUL: an RSRP threshold for the selection between the NUL carrier and the SUL carrier;
candidateBeamRSList: a list of reference signals (CSI-RS and/or SSB) identifying the candidate beams for recovery and the associated Random Access parameters;
recoverySearchSpaceId: the search space identity for monitoring the response of the beam failure recovery request;
powerRampingStep: the power-ramping factor;
powerRampingStepHighPriority: the power-ramping factor in case of prioritized Random Access procedure;
scalingFactorBI: a scaling factor for prioritized Random Access procedure;
ra-PreambleIndex: Random Access Preamble;
ra-ssb-OccasionMaskIndex: defines PRACH occasion(s) associated with an SSB in which the MAC entity may transmit a Random Access Preamble (see clause 7.4);
ra-OccasionList: defines PRACH occasion(s) associated with a CSI-RS in which the MAC entity may transmit a Random Access Preamble;
ra-PreambleStartIndex: the starting index of Random Access Preamble(s) for on-demand SI request;
preambleTransMax: the maximum number of Random Access Preamble transmission;
ssb-perRACH-OccasionAndCB-PreamblesPerSSB: defines the number of SSBs mapped to each PRACH occasion and the number of contention-based Random Access Preambles mapped to each SSB;
if groupBconfigured is configured, then Random Access Preambles group B is configured.
Amongst the contention-based Random Access Preambles associated with an SSB (as defined in TS 38.213 [6]), the first numberOfRA-PreamblesGroupA Random Access Preambles belong to Random Access Preambles group A. The remaining Random Access Preambles associated with the SSB belong to Random Access Preambles group B (if configured).

NOTE 2: If Random Access Preambles group B is supported by the cell Random Access Preambles group B is included for each SSB.
  if Random Access Preambles group B is configured:
    ra-Msg3SizeGroupA: the threshold to determine the groups of Random Access Preambles;
    msg3-DeltaPreamble: $\Delta_{PREAMBLE\_Msg3}$ in TS 38.213 [6];
    messagePowerOffsetGroupB: the power offset for preamble selection;
    numberOfRA-PreamblesGroupA: defines the number of Random Access Preambles in Random Access Preamble group A for each SSB.
  the set of Random Access Preambles and/or PRACH occasions for SI request, if any;
  the set of Random Access Preambles and/or PRACH occasions for beam failure recovery request, if any;
  the set of Random Access Preambles and/or PRACH occasions for reconfiguration with sync, if any;
  ra-Response Window: the time window to monitor RA response(s) (SpCell only);
  ra-ContentionResolutionTimer: the Contention Resolution Timer (SpCell only).
In addition, the following information for related Serving Cell is assumed to be available for UEs:
  if Random Access Preambles group B is configured:
    if the Serving Cell for the Random Access procedure is configured with supplementary uplink as specified in TS 38.331 [5], and SUL carrier is selected for performing Random Access Procedure:
      $P_{CMAX,f,c}$ of the SUL carrier as specified in TS 38.101-1 [14], TS 38.101-2 [15], and TS 38.101-3 [16].
    else:
      $P_{CMAX,f,c}$ of the NUL carrier as specified in TS 38.101-1 [14], TS 38.101-2 [15], and TS 38.101-3 [16].
The following UE variables are used for the Random Access procedure:
  PREAMBLE_INDEX;
  PREAMBLE_TRANSMISSION_COUNTER;
  PREAMBLE_POWER_RAMPING_COUNTER;
  PREAMBLE_POWER_RAMPING_STEP;
  PREAMBLE_RECEIVED_TARGET_POWER;
  PREAMBLE_BACKOFF;
  PCMAX;
  SCALING_FACTOR_BI;
  TEMPORARY C-RNTI.
When the Random Access procedure is initiated on a Serving Cell, the MAC entity shall:
  1> flush the Msg3 buffer;
  1> set the PREAMBLE_TRANSMISSION_COUNTER to 1;
  1> set the PREAMBLE_POWER_RAMPING_COUNTER to 1;
  1> set the PREAMBLE_BACKOFF to 0 ms;
  1> if the carrier to use for the Random Access procedure is explicitly signalled:
    2> select the signalled carrier for performing Random Access procedure;
    2> set the PCMAX to $P_{CMAX,f,c}$ of the signalled carrier.
  1> else if the carrier to use for the Random Access procedure is not explicitly signalled; and
  1> if the Serving Cell for the Random Access procedure is configured with supplementary uplink as specified in TS 38.331 [5]; and
    1> if the RSRP of the downlink pathloss reference is less than rsrp-ThresholdSSB-SUL:
      2> select the SUL carrier for performing Random Access procedure;
      2> set the PCMAX to $P_{CMAX,f,c}$ of the SUL carrier.
  1> else:
    2> select the NUL carrier for performing Random Access procedure;
    2> set the PCMAX to $P_{CMAX,f,c}$ of the NUL carrier.
  1> perform the BWP operation as specified in clause 5.15;
  1> set PREAMBLE_POWER_RAMPING_STEP to powerRampingStep;
  1> set SCALING_FACTOR_BI to 1;
  1> if the Random Access procedure was initiated for beam failure recovery (as specified in clause 5.17); and
  1> if beamFailureRecoveryConfig is configured for the active UL BWP of the selected carrier:
    2> start the beamFailureRecoveryTimer, if configured;
    2> apply the parameters powerRampingStep, preambleReceivedTargetPower, and preambleTransMax configured in the beamFailureRecoveryConfig;
    2> if powerRampingStepHighPriority is configured in the beamFailureRecoveryConfig:
      3> set PREAMBLE_POWER_RAMPING_STEP to the powerRampingStepHighPriority.
    2> else:
      3> set PREAMBLE_POWER_RAMPING_STEP to powerRampingStep.
    2> if scalingFactorBI is configured in the beamFailureRecoveryConfig:
      3> set SCALING_FACTOR_BI to the scalingFactorBI.
  1> else if the Random Access procedure was initiated for handover; and
  1> if rach-ConfigDedicated is configured for the selected carrier:
    2> if powerRampingStepHighPriority is configured in the rach-ConfigDedicated:
      3> set PREAMBLE_POWER_RAMPING_STEP to the powerRampingStepHighPriority.
    2> if scalingFactorBI is configured in the rach-ConfigDedicated:
      3> set SCALING_FACTOR_BI to the scalingFactorBI.
  1> perform the Random Access Resource selection procedure (see clause 5.1.2).

5.1.2 Random Access Resource Selection

The MAC entity shall:
  1> if the Random Access procedure was initiated for beam failure recovery (as specified in clause 5.17); and
  1> if the beamFailureRecoveryTimer (in clause 5.17) is either running or not configured; and
  1> if the contention-free Random Access Resources for beam failure recovery request associated with any of the SSBs and/or CSI-RSs have been explicitly provided by RRC; and
  1> if at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available:
    2> select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList;

2> if CSI-RS is selected, and there is no ra-PreambleIndex associated with the selected CSI-RS:
   3> set the PREAMBLE_INDEX to a ra-PreambleIndex corresponding to the SSB in candidateBeamRSList which is quasi-colocated with the selected CSI-RS as specified in TS 38.214 [7].
2> else:
   3> set the PREAMBLE_INDEX to a ra-PreambleIndex corresponding to the selected SSB or CSI-RS from the set of Random Access Preambles for beam failure recovery request.
1> else if the ra-PreambleIndex has been explicitly provided by PDCCH; and
1> if the ra-PreambleIndex is not 0b000000:
   2> set the PREAMBLE_INDEX to the signalled ra-PreambleIndex;
   2> select the SSB signalled by PDCCH.
1> else if the contention-free Random Access Resources associated with SSBs have been explicitly provided in rach-ConfigDedicated and at least one SSB with SS-RSRP above rsrp-ThresholdSSB amongst the associated SSBs is available:
   2> select an SSB with SS-RSRP above rsrp-ThresholdSSB amongst the associated SSBs;
   2> set the PREAMBLE_INDEX to a ra-PreambleIndex corresponding to the selected SSB.
1> else if the contention-free Random Access Resources associated with CSI-RSs have been explicitly provided in rach-ConfigDedicated and at least one CSI-RS with CSI-RSRP above rsrp-ThresholdCSI-RS amongst the associated CSI-RSs is available:
   2> select a CSI-RS with CSI-RSRP above rsrp-ThresholdCSI-RS amongst the associated CSI-RSs;
   2> set the PREAMBLE_INDEX to a ra-PreambleIndex corresponding to the selected CSI-RS.
1> else if the Random Access procedure was initiated for SI request (as specified in TS 38.331 [5]); and
1> if the Random Access Resources for SI request have been explicitly provided by RRC:
   2> if at least one of the SSBs with SS-RSRP above rsrp-ThresholdSSB is available:
     3> select an SSB with SS-RSRP above rsrp-ThresholdSSB.
   2> else:
     3> select any SSB.
   2> select a Random Access Preamble corresponding to the selected SSB, from the Random Access Preamble(s) determined according to ra-PreambleStartIndex as specified in TS 38.331 [5];
   2> set the PREAMBLE_INDEX to selected Random Access Preamble.
1> else (i.e. for the contention-based Random Access preamble selection):
   2> if at least one of the SSBs with SS-RSRP above rsrp-ThresholdSSB is available:
     3> select an SSB with SS-RSRP above rsrp-ThresholdSSB.
   2> else:
     3> select any SSB.
   2> if Msg3 has not yet been transmitted:
     3> if Random Access Preambles group B is configured:
        4> if the potential Msg3 size (UL data available for transmission plus MAC header and, where required, MAC CEs) is greater than ra-Msg3SizeGroupA and the pathloss is less than PCMAX (of the Serving Cell performing the Random Access Procedure)-preambleReceivedTargetPower-msg3-DeltaPreamble-messagePowerOffsetGroupB; or
        4> if the Random Access procedure was initiated for the CCCH logical channel and the CCCH SDU size plus MAC subheader is greater than ra-Msg3SizeGroupA:
          5> select the Random Access Preambles group B.
        4> else:
          5> select the Random Access Preambles group A.
     3> else:
        4> select the Random Access Preambles group A.
   2> else (i.e. Msg3 is being retransmitted):
     3> select the same group of Random Access Preambles as was used for the Random Access Preamble transmission attempt corresponding to the first transmission of Msg3.
   2> select a Random Access Preamble randomly with equal probability from the Random Access Preambles associated with the selected SSB and the selected Random Access Preambles group.
   2> set the PREAMBLE_INDEX to the selected Random Access Preamble.
1> if the Random Access procedure was initiated for SI request (as specified in TS 38.331 [5]); and
1> if ra-AssociationPeriodIndex and si-RequestPeriod are configured:
   2> determine the next available PRACH occasion from the PRACH occasions corresponding to the selected SSB in the association period given by ra-AssociationPeriodIndex in the si-RequestPeriod permitted by the restrictions given by the ra-ssb-OccasionMaskIndex if configured (the MAC entity shall select a PRACH occasion randomly with equal probability amongst the consecutive PRACH occasions according to clause 8.1 of TS 38.213 [6] corresponding to the selected SSB).
1> else if an SSB is selected above:
   2> determine the next available PRACH occasion from the PRACH occasions corresponding to the selected SSB permitted by the restrictions given by the ra-ssb-OccasionMaskIndex if configured or indicated by PDCCH (the MAC entity shall select a PRACH occasion randomly with equal probability amongst the consecutive PRACH occasions according to clause 8.1 of TS 38.213 [6], corresponding to the selected SSB; the MAC entity may take into account the possible occurrence of measurement gaps when determining the next available PRACH occasion corresponding to the selected SSB).
1> else if a CSI-RS is selected above:
   2> if there is no contention-free Random Access Resource associated with the selected CSI-RS:
     3> determine the next available PRACH occasion from the PRACH occasions, permitted by the restrictions given by the ra-ssb-OccasionMaskIndex if configured, corresponding to the SSB in candidateBeamRSList which is quasi-colocated with the selected CSI-RS as specified in TS 38.214 [7] (the MAC entity shall select a PRACH occasion randomly with equal probability amongst the consecutive PRACH occasions according to clause 8.1 of TS 38.213 [6], corresponding to the SSB which is quasi-colocated with the selected CSI-RS; the MAC entity may take into account the possible occurrence of measurement gaps when determining the next available PRACH occasion corresponding to the SSB which is quasi-colocated with the selected CSI-RS).
2> else:
  3> determine the next available PRACH occasion from the PRACH occasions in ra-OccasionList corresponding to the selected CSI-RS (the MAC entity shall select a PRACH occasion randomly with equal probability amongst the PRACH occasions occurring simultaneously but on different subcarriers, corresponding to the selected CSI-RS; the MAC entity may take into account the possible occurrence of measurement gaps when determining the next available PRACH occasion corresponding to the selected CSI-RS).
1> perform the Random Access Preamble transmission procedure (see clause 5.1.3).
NOTE: When the UE determines if there is an SSB with SS-RSRP above rsrp-ThresholdSSB or a CSI-RS with CSI-RSRP above rsrp-ThresholdCSI-RS, the UE uses the latest unfiltered L1-RSRP measurement.

5.1.4 Random Access Response Reception

Once the Random Access Preamble is transmitted and regardless of the possible occurrence of a measurement gap, the MAC entity shall:
1> if the contention-free Random Access Preamble for beam failure recovery request was transmitted by the MAC entity:
  2> start the ra-Response Window configured in BeamFailureRecoveryConfig at the first PDCCH occasion as specified in TS 38.213 [6] from the end of the Random Access Preamble transmission;
  2> monitor for a PDCCH transmission on the search space indicated by recoverySearchSpaceId of the SpCell identified by the C-RNTI while ra-Response Window is running
1> else:
  2> start the ra-Response Window configured in RACH-ConfigCommon at the first PDCCH occasion as specified in TS 38.213 [6] from the end of the Random Access Preamble transmission;
  2> monitor the PDCCH of the SpCell for Random Access Response(s) identified by the RA-RNTI while the ra-Response Window is running
1> if notification of a reception of a PDCCH transmission on the search space indicated by recoverySearchSpaceId is received from lower layers on the Serving Cell where the preamble was transmitted; and
1> if PDCCH transmission is addressed to the C-RNTI; and
1> if the contention-free Random Access Preamble for beam failure recovery request was transmitted by the MAC entity:
  2> consider the Random Access procedure successfully completed.
1> else if a downlink assignment has been received on the PDCCH for the RA-RNTI and the received TB is successfully decoded:
  2> if the Random Access Response contains a MAC subPDU with Backoff Indicator:
    3> set the PREAMBLE_BACKOFF to value of the BI field of the MAC subPDU using Table 7.2-1, multiplied with SCALING_FACTOR_BI.
  2> else:
    3> set the PREAMBLE_BACKOFF to 0 ms.
  2> if the Random Access Response contains a MAC subPDU with Random Access Preamble identifier corresponding to the transmitted PREAMBLE_INDEX (see clause 5.1.3):
    3> consider this Random Access Response reception successful.
  2> if the Random Access Response reception is considered successful:
    3> if the Random Access Response includes a MAC subPDU with RAPID only:
      4> consider this Random Access procedure successfully completed;
      4> indicate the reception of an acknowledgement for SI request to upper layers.
    3> else:
      4> apply the following actions for the Serving Cell where the Random Access Preamble was transmitted:
        5> process the received Timing Advance Command (see clause 5.2);
        5> indicate the preambleReceivedTargetPower and the amount of power ramping applied to the latest Random Access Preamble transmission to lower layers (i.e. (PREAMBLE_POWER_RAMPING_COUNTER−1)×PREAMBLE_POWER_RAMPING_STEP);
        5> if the Serving Cell for the Random Access procedure is SRS-only SCell:
          6> ignore the received UL grant.
        5> else:
          6> process the received UL grant value and indicate it to the lower layers.
      4> if the Random Access Preamble was not selected by the MAC entity among the contention-based Random Access Preamble(s):
        5> consider the Random Access procedure successfully completed.
      4> else:
        5> set the TEMPORARY C-RNTI to the value received in the Random Access Response;
        5> if this is the first successfully received Random Access Response within this Random Access procedure:
          6> if the transmission is not being made for the CCCH logical channel:
            7> indicate to the Multiplexing and assembly entity to include a C-RNTI MAC CE in the subsequent uplink transmission.
          6> obtain the MAC PDU to transmit from the Multiplexing and assembly entity and store it in the Msg3 buffer.
NOTE: If within a Random Access procedure, an uplink grant provided in the Random Access Response for the same group of contention-based Random Access Preambles has a different size than the first uplink grant allocated during that Random Access procedure, the UE behavior is not defined.
1> if ra-Response Window configured in BeamFailureRecoveryConfig expires and if a PDCCH transmission on the search space indicated by recoverySearchSpaceId addressed to the C-RNTI has not been received on the Serving Cell where the preamble was transmitted; or
1> if ra-Response Window configured in RACH-ConfigCommon expires, and if the Random Access Response containing Random Access Preamble identifiers that matches the transmitted PREAMBLE_INDEX has not been received:

2> consider the Random Access Response reception not successful;
2> increment PREAMBLE_TRANSMISSION_COUNTER by 1;
2> if PREAMBLE_TRANSMISSION_COUNTER=preambleTransMax+1:
  3> if the Random Access Preamble is transmitted on the SpCell:
    4> indicate a Random Access problem to upper layers;
    4> if this Random Access procedure was triggered for SI request:
      5> consider the Random Access procedure unsuccessfully completed.
  3> else if the Random Access Preamble is transmitted on a SCell:
    4> consider the Random Access procedure unsuccessfully completed.
2> if the Random Access procedure is not completed:
  3> select a random backoff time according to a uniform distribution between 0 and the PREAMBLE_BACKOFF;
  3> if the criteria (as defined in clause 5.1.2) to select contention-free Random Access Resources is met during the backoff time:
    4> perform the Random Access Resource selection procedure (see clause 5.1.2);
  3> else:
    4> perform the Random Access Resource selection procedure (see clause 5.1.2) after the backoff time.

The MAC entity may stop ra-Response Window (and hence monitoring for Random Access Response(s)) after successful reception of a Random Access Response containing Random Access Preamble identifiers that matches the transmitted PREAMBLE_INDEX.

HARQ operation is not applicable to the Random Access Response reception.

Description related to conditions for initiating (e.g., triggering) EDT in LTE is quoted below from 3GPP TS 36.331 V15.6.0.

5.3 Connection Control
5.3.3 RRC Connection Establishment
5.3.3.1 b Conditions for Initiating EDT
A BL UE, UE in CE or NB-IoT UE can initiate EDT when all of the following conditions are fulfilled:
1> for CP-EDT, the upper layers request establishment of an RRC connection, the UE supports CP-EDT, and SystemInformationBlockType2 (SystemInformationBlockType2-NB in NB-IoT) includes cp-EDT; or
1> for UP-EDT, the upper layers request resumption of an RRC connection, the UE supports UP-EDT, SystemInformationBlockType2 (SystemInformationBlockType2-NB in NB-IoT) includes up-EDT, and the UE has a stored value of the nextHopChainingCount provided in the RRCConnectionRelease message with suspend indication during the preceding suspend procedure;
1> the establishment or resumption request is for mobile originating calls and the establishment cause is mo-Data or mo-ExceptionData or delayTolerantAccess;
1> the establishment or resumption request is suitable for EDT as specified in TS 36.300 [9], subclause 7.3b.1;
1> SystemInformationBlockType2 (SystemInformationBlockType2-NB in NB-IoT) includes edt-Parameters;
1> the size of the resulting MAC PDU including the total UL data is expected to be smaller than or equal to the TBS signalled in edt-TBS as specified in TS 36.321 [6], clause 5.1.1;
1> EDT fallback indication has not been received from lower layers for this establishment or resumption procedure;

NOTE 1: Upper layers request or resume an RRC connection. The interaction with NAS is up to UE implementation.
NOTE 2: It is up to UE implementation how the UE determines whether the size of UL data is suitable for EDT.

Description related to the configuration of Supplementary Uplink (SUL) in NR is quoted below from 3GPP TS 38.331 V15.6.0.

6.3 RRC Information Elements
6.3.2 Radio Resource Control Information Elements
ServingCellConfigCommonSIB
The IE ServingCellConfigCommonSIB is used to configure cell specific parameters of a UE's serving cell in SIB1.

ServingCellConfigCommonSIB Information Element

```
-- ASN1START
-- TAG-SERVINGCELLCONFIGCOMMONSIB-START
ServingCellConfigCommonSIB ::=    SEQUENCE {
    downlinkConfigCommon          DownlinkConfigCommonSIB,
    uplinkConfigCommon            UplinkConfigCommonSIB
OPTIONAL, -- Need R
    supplementaryUplink           UplinkConfigCommonSIB
OPTIONAL, -- Need R
    ...
}
-- TAG-SERVINGCELLCONFIGCOMMONSIB-STOP
-- ASN1STOP
```

UplinkConfigCommonSIB
The IE UplinkConfigCommonSIB provides common uplink parameters of a cell.

UplinkConfigCommonSIB Information Element

```
-- ASN1START
-- TAG-UPLINKCONFIGCOMMONSIB-START
UplinkConfigCommonSIB ::=    SEQUENCE {
    frequencyInfoUL              FrequencyInfoUL-SIB,
    initialUplinkBWP             BWP-UplinkCommon,
    timeAlignmentTimerCommon     TimeAlignmentTimer
}
-- TAG-UPLINKCONFIGCOMMONSIB-STOP
-- ASN1STOP
```

BWP-UplinkCommon
The IE BWP-UplinkCommon is used to configure the common parameters of an uplink BWP. They are "cell specific" and the network ensures the necessary alignment with corresponding parameters of other UEs. The common parameters of the initial bandwidth part of the PCell are also provided via system information. For all other serving cells, the network provides the common parameters via dedicated signalling.

BWP-UplinkCommon Information Element

```
-- ASN1START
-- TAG-BWP-UPLINKCOMMON-START
BWP-UplinkCommon ::=          SEQUENCE {
    genericParameters         BWP,
    rach-ConfigCommon         SetupRelease { RACH-
ConfigCommon } OPTIONAL, -- Need M
    ...
}
-- TAG-BWP-UPLINKCOMMON-STOP
-- ASN1STOP
```

BWP-UplinkCommon Field Descriptions rach-ConfigCommon
Configuration of cell specific random access parameters which the UE uses for contention based and contention free random access as well as for contention based beam failure recovery in this BWP. The NW configures SSB-based RA (and hence RACH-ConfigCommon) only for UL BWPs if the linked DL BWPs (same bwp-Id as UL-BWP) are the initial DL BWPs or DL BWPs containing the SSB associated to the initial DL BWP. The network configures rach-ConfigCommon, whenever it configures contention free random access (for reconfiguration with sync or for beam failure recovery).

A UE may be a Machine-Type Communications UE (MTC UE) and/or a Narrow Band Internet of Things (NB-IoT) UE. "Bandwidth reduced and Low complexity UEs (BL UEs)" and/or "UEs in enhanced coverage (UEs in EC, UEs in CE, CE UEs)" could be referred to using the term "MTC UE". In RRC_IDLE state (e.g., Radio Resource Control (RRC) idle state), if a UE initiates a Random Access (RA) procedure, the RA procedure may be for Early Data Transmission (EDT) and/or the RA procedure may not be for EDT. In RRC_IDLE state, if the UE initiates a RA procedure, the RA procedure may be for Mobile-terminated EDT (MT-EDT) and/or may not be for MT-EDT. The term "Physical Downlink Control Channel (PDCCH)", as used herein, may refer to a Machine-Type Communications PDCCH (MPDCCH) for MTC UEs and/or a Narrowband PDCCH (NPDCCH) for NB-IoT UEs. The term "Physical Random Access Channel (PRACH)", as used herein, may refer to PRACH for MTC UEs and/or Narrowband PRACH (NPRACH) for NB-IoT UEs. The statements in this paragraph may be applied to LTE (e.g., 4G technology) and/or one or more other technologies. The statements described above in this paragraph may be generally applied to all the following paragraphs, unless otherwise specified.

A contention-based RA procedure may comprise four steps, wherein messages transmitted and/or received in each step of the four steps are referred to as "Msg1", "Msg2", "Msg3", and/or "Msg4", respectively. A non-contention-based RA procedure may comprise two steps, wherein messages transmitted and/or received in each step of the two steps are referred to as "Msg1", and/or "Msg2", respectively. The statements described above in this paragraph may be generally applied to all the following paragraphs, unless otherwise specified.

EDT is introduced in LTE Release 15 in order to improve transmission efficiency and/or reduce power consumption for MTC UEs and/or NB-IoT UEs. EDT may be applicable for MTC UEs and/or NB-IoT UEs. EDT may be triggered (and/or initiated) in RRC_IDLE state. After EDT is triggered (and/or initiated), uplink user data (e.g. Mobile Originated data) may be included in a Msg3 during a RA procedure (e.g., Msg3 may correspond to a third message of the RA procedure), and a network may include downlink user data in Msg4 during the RA procedure (e.g., Msg4 may correspond to a fourth message of the RA procedure). One benefit of EDT is that a UE may transmit the uplink user data without entering RRC_CONNECTED state (e.g., RRC connected state). It is also possible that EDT falls back to legacy RRC connection establishment/resume procedure, and/or that the uplink user data is transmitted after the UE enters RRC_CONNECTED mode. The Release 15 EDT may also be referred to as "Mobile-originated EDT (MO-EDT)". EDT may be triggered by RRC and/or Medium Access Control (MAC) may indicate to the RRC that EDT is canceled. An ongoing RA procedure after EDT is triggered and/or before EDT is canceled (and/or before the MAC indicates to the RRC that EDT is canceled) may be referred to as "EDT RA". An ongoing RA procedure when EDT is not triggered and/or after EDT is canceled may be referred to as "non-EDT RA". A configuration for EDT (e.g., at least one of EDT-PRACH-ParametersCE, edt-Parameters, etc.) and/or a configuration for non-EDT RA may be provided in System Information (e.g. SIB2). Uplink user data and/or downlink user data may comprise data from application layer, data from (and/or transported via) one or more data channels, and/or data from (and/or transported via) one or more data radio bearers.

There are at least two types of EDT (or MO-EDT).

A first type of EDT (or a first type of MO-EDT) is control plane EDT (CP-EDT) (e.g., EDT for Control Plane Cellular Internet of Things (CIoT) Evolved Packet System (EPS) optimizations, such as discussed in Section 7.3b.2 of 3GPP TS 36.300 V15.6.0). In CP-EDT, uplink user data is transmitted in a Non-Access Stratum (NAS) message concatenated in an uplink RRC message (e.g., RRCEarlyDataRequest message) on a Common Control Channel (CCCH). The uplink RRC message (e.g., RRCEarlyDataRequest message) may be included in a Msg3 during a RA procedure (e.g., the Msg3 may correspond to a third message of the RA procedure, where the Msg3 is transmitted by a UE to an eNB). Downlink user data may be transmitted in a NAS message concatenated in a downlink RRC message (e.g., RRCEarlyDataComplete message) on a CCCH. The downlink RRC message (e.g., RRCEarlyDataComplete message) may be included in a Msg4 during the RA procedure (e.g., the Msg4 may correspond to a fourth message of the RA procedure, where the Msg4 is transmitted by the eNB to the UE). If a Mobility Management Entity (MME) and/or the eNB decide to change the UE to RRC_CONNECTED mode (e.g., change the UE from RRC_IDLE mode to RRC_CONNECTED mode), a RRCConnectionSetup message may be sent (to the UE) in Msg4 to fall back to the legacy RRC Connection establishment procedure.

A second type of EDT (or a second type of MO-EDT) is user plane EDT (UP-EDT) (e.g., EDT for User Plane CIoT EPS optimizations, such as discussed in Section 7.3b.3 of 3GPP TS 36.300 V15.6.0). In UP-EDT, uplink user data is transmitted on a Dedicated Traffic Channel (DTCH) multiplexed with an uplink RRC message (e.g., RRCConnectionResumeRequest message) on a CCCH. In some embodiments, a DTCH Service Data Unit (SDU) and/or a CCCH SDU are included in a Msg3 during a RA procedure (e.g., the Msg3 may correspond to a third message of the RA procedure, where the Msg3 is transmitted by a UE to an eNB). Downlink user data may be transmitted on a DTCH multiplexed with a downlink RRC message (e.g., downlink RRCConnectionRelease message) on a Dedicated Control Channel (DCCH). A DTCH SDU and/or a DCCH SDU may be included in a Msg4 during the RA procedure. If a MME and/or the eNB decide to change the UE to RRC_CONNECTED mode (e.g., change the UE from RRC_IDLE mode to RRC_CONNECTED mode), a RRC message (e.g., RRCConnectionResume message) (and/or downlink user data) is sent (to the UE) in the Msg4 to fall back to the RRC Connection resume procedure.

In some embodiments, one or more PRACH resources (e.g., one or more time resources and/or one or more frequency resources) used for EDT RA may be different than one or more PRACH resources used for non-EDT RA. Alternatively and/or additionally, one or more PRACH resources used for EDT RA may be the same as one or more PRACH resources used for non-EDT RA. For example, EDT RA and non-EDT RA may share one or more (same) PRACH resources. In some embodiments, one or more RA preambles used for EDT RA may be different than one or more RA preambles used for non-EDT RA. Alternatively and/or additionally, one or more RA preambles used for EDT RA may be the same as one or more RA preambles used for non-EDT RA. For example, EDT RA and non-EDT RA may share one or more (same) RA preambles.

In some embodiments, EDT RA and non-EDT RA may share the same set of PRACH resources (e.g., the same set of one or more PRACH resources) and use different RA preambles (e.g., one or more RA preambles used for EDT RA are different than one or more RA preambles used for non-EDT RA). In a first example, in a scenario where EDT RA and non-EDT RA share the same set of PRACH resources, a first set of preambles of a plurality of RA preambles may be used for non-EDT RA and/or a second set of preambles of the plurality of RA preambles may be used for EDT RA. The plurality of RA preambles may comprise 64 preambles (and/or a different quantity of preambles). The first set of preambles may comprise preambles among the plurality of RA preambles and/or the second set of preambles may comprise remaining preambles of the plurality of RA preambles (other than the first set of preambles). A quantity of the first set of preambles may be X and/or a quantity of the second set of preambles may be a quantity of the plurality of RA preambles (e.g., 64) subtracted by X. The first set of preambles may comprise the first (e.g., initial) X preambles of the plurality of preambles and/or the second set of preambles may comprise preambles following the first X preambles.

In some embodiments, EDT RA and non-EDT RA may share the same set of RA preambles (e.g., the same set of one or more RA preambles) and use different PRACH resources (e.g., one or more PRACH resources used for EDT RA are different than one or more PRACH resources used for non-EDT RA). In a second example, in a scenario where EDT RA and non-EDT use different PRACH resources, both non-EDT RA and EDT RA may use one, some and/or all of the plurality of RA preambles (e.g., 64 preambles). Both non-EDT RA and EDT RA may use one, some and/or all of the plurality of RA preambles (and/or may share the same set of RA preambles) due to non-EDT RA and EDT RA using different PRACH resources, which enables a network to identify and/or distinguish between non-EDT RA and EDT RA based on PRACH resources used for non-EDT RA and EDT RA.

In some embodiments, after the UE initiates (e.g., triggers) EDT (e.g., the EDT may be initiated and/or triggered in RRC layer of the UE) and initiates an EDT RA (e.g., the EDT RA may be initiated in MAC layer of the UE), the UE may cancel EDT and/or fallback the EDT RA to non-EDT RA (e.g., stop performing the EDT RA and start performing a non-EDT RA procedure and/or resume/continue RA procedure through non-EDT RA) responsive to a condition of one or more first conditions being met.

A first condition of the one or more first conditions may correspond to no available PRACH resource for EDT. The first condition may be met when there is no available PRACH resource for EDT (e.g., there is no PRACH resource for EDT available to the UE). For example, the first condition may be met in a scenario in which a network does not configure one or more PRACH resources for EDT (for the UE), and thus the UE may not be able to perform EDT RA. A PRACH resource for EDT may be associated with one or more enhanced coverage levels. In a scenario in which there are no PRACH resources for EDT associated with the one or more enhanced coverage levels available to the UE, the UE may not be able to perform EDT RA in an enhanced coverage level of the one or more enhanced coverage levels.

In some embodiments, the UE may check whether there are one or more PRACH resources for EDT available (to the UE) during (e.g., at the beginning of) RA Resource selection (e.g., RA Resource selection is discussed in Section 5.1.2 of 3GPP TS 36.321 V15.6.0). For example, the UE may determine whether the first condition is met at the beginning of RA Resource selection. In an example, the UE may determine that the first condition is met based on a determination that no PRACH resource for EDT is available to the UE. Alternatively and/or additionally, the UE may determine that the first condition is met based on a determination that no PRACH resource for EDT associated with the one or more enhanced coverage levels is available to the UE.

A second condition of the one or more first conditions may correspond to an uplink message size being larger than a configured threshold. The configured threshold may be edt-TBS. In some embodiments, edt-TBS is a field, of a configuration, indicative of a threshold Transport Block (TB) size corresponding to the configured threshold.

The TB size of Msg3 in EDT may be limited to a size (e.g., 1000 bits). For example, the configured threshold (e.g., the threshold TB size indicated by edt-TBS) may correspond to the size. Thus, in a scenario in which the UE has data exceeding the configured threshold (e.g., a size of the data exceeds the threshold TB size indicated by edt-TBS), the UE may not be able to transmit all of the data in a single Msg3 MAC Protocol Data Unit (PDU) and/or should fallback to traditional RRC connection establishment and/or resume procedure through non-EDT RA. The configured threshold may be associated with a specific enhanced coverage level (e.g., the configured threshold may correspond to a threshold TB size associated with the specific coverage level). In some embodiments, the UE may perform a comparison to determine whether the second condition is met (e.g., the comparison may be performed by comparing a potential uplink message size with the configured threshold to determine whether the potential uplink message size exceeds the configured threshold). The UE may use a threshold associated with a current enhanced coverage level to perform the comparison to determine whether the second condition is met.

The UE may check whether the potential uplink message size exceeds the configured threshold during (e.g., at the beginning of) RA Resource selection (e.g., RA Resource selection is discussed in Section 5.1.2 of 3GPP TS 36.321 V15.6.0). For example, the UE may determine whether the second condition is met at the beginning of RA Resource selection. In an example, the UE may determine that the second condition is met based on a determination that the potential uplink message exceeds the configured threshold.

A third condition of the one or more first conditions may correspond to the UE transmitting an EDT Msg1 (for the EDT RA) and receiving a Msg2 (such as after transmitting the EDT Msg1) that is not for EDT (e.g., an uplink grant received in the Msg2 of the EDT RA is not for EDT).

In some embodiments, the network may not have enough uplink resources for EDT Msg3. For example, the network may not have enough uplink resources to receive an EDT Msg3 transmission from the UE. In a scenario in which the network does not have enough uplink resources for EDT Msg3, the network may decide to fallback the UE to non-EDT RA (e.g., indicate to the UE to stop performing the EDT RA and start performing a non-EDT RA procedure and/or indicate to the UE to resume/continue RA procedure through non-EDT RA) and/or the network may transmit a Msg2 that is not for EDT.

The UE checks whether the Msg2 (and/or the uplink grant received in the Msg2) is for EDT responsive to reception (e.g., successful reception) of the RA Response (e.g., RA Response is discussed in Section 5.1.4 of 3GPP TS 36.321 V15.6.0). For example, the UE may determine whether the third condition is met responsive to reception (e.g., successful reception) of the RA Response. In an example, the UE may determine that the third condition is met based on a determination that the Msg2 (and/or the uplink grant received in the Msg2) is not for EDT.

NR_Lite (or called NR_Light and/or NR-IoT) may be introduced in NR Release 17 (and/or one or more other NR releases). NR_Lite may be targeted towards (and/or used by) mid-end and/or high-end IoT devices (e.g., at least one of industrial sensors, surveillance cameras, etc.). LTE MTC, NB-IoT and/or NR mMTC may be targeted towards (and/or used by) low-end IoT devices. Compared to LTE MTC and/or NB-IoT, NR_Lite may have higher data rate and/or lower latency. However, compared to LTE MTC and/or NB-IoT, NR_Lite implementation may require higher device complexity and/or higher cost. Compared to NR enhanced Mobile Broadband (eMBB), NR_Lite may have lower device complexity and/or lower cost but also lower data rate and/or higher latency. In terms of battery life, a device implementing NR_Lite may have a longer battery life than a device implementing NR eMBB and/or a shorter battery life than a device implementing LTE MTC and/or NB-IoT. A new UE capability may be defined for NR_Lite UE. In some embodiments, a NR_Lite UE connects to gNB rather than (and/or in addition to) eNB. In some embodiments, a NR_Lite UE supports at least some NR techniques, such as one or more NR techniques corresponding to at least one of Bandwidth part (BWP) operation, beam operation, Supplementary Uplink (SUL) operation, etc. In some embodiments, a RA procedure in NR_Lite may be similar to a NR RA procedure (e.g., the current NR RA procedure discussed in text quoted from one or more references in the foregoing description). For example, one or more features and/or techniques (e.g., one or more operations, one or more messages, content of one or more messages, etc.) may be common to the RA procedure in NR_Lite and the NR RA procedure. A SUL can be configured and/or used to improve uplink coverage for high frequency scenarios. With a SUL, the UE may be configured with at least two uplinks for one downlink of the same Serving cell. For example, the at least two uplinks may comprise the SUL and another uplink. The other uplink of the at least two uplinks may be called Normal Uplink (NUL).

One or more mechanisms for improving transmission efficiency and/or reducing power consumption may be introduced in NR to support NR_Lite devices (e.g., NR_Lite UEs) in NR. For example, NR may introduce a mechanism similar and/or related to EDT for LTE MTC or NB-IoT. For EDT, uplink user data may be included in Msg3 during a RA procedure initiated in RRC_IDLE state or in RRC_INACTIVE state (e.g., RRC inactive state). Alternatively and/or additionally, downlink user data may be included in Msg4 during the RA procedure. For simplicity, the mechanism for including uplink user data in Msg3 and/or a different message during the RA procedure and/or for including downlink user data in Msg4 and/or a different message during the RA procedure is called "EDT" (early data transmission) in the following paragraphs. In some embodiments, an EDT RA may be differentiated from a non-EDT RA, such as by at least one of using separate and/or different PRACH resources, using separate and/or different RA preambles, etc. In some embodiments, a Msg3 of a non-EDT RA may not comprise uplink user data when the UE is in RRC_IDLE or RRC_INACTIVE (e.g., the Msg3 of the non-EDT RA may not comprise any uplink user data when the UE is in RRC_IDLE state or RRC_INACTIVE state).

In some implementations of a NR RA procedure, upon initiation of the RA procedure (e.g., initialization of a RA procedure is discussed in Section 5.1.1 of 3GPP TS 38.321 V15.6.0), the UE may be required to determine to use a NUL carrier or a SUL carrier for performing the RA procedure. According to the current NR MAC specification (such as discussed in 3GPP TS 38.321 V15.6.0), the determination may be performed (purely) based on whether a measured Reference Signal Received Power (RSRP) of a downlink pathloss reference is less than a configured threshold (e.g., rsrp-ThresholdSSB-SUL). For example, the UE may select the SUL carrier for performing the RA procedure (rather than NUL carrier, for example) based on a determination that the measured RSRP is less than the configured threshold. After the UE selects the SUL carrier (and/or the NUL carrier), the UE may perform BWP operation, apply specific parameters, and/or then perform RA Resource selection procedure (e.g., RA Resource selection procedure is discussed in Section 5.1.2 of 3GPP TS 38.321 V15.6.0). In the RA Resource selection procedure, the UE may select a Synchronization Signal (SS)/Physical Broadcast Channel (PBCH) Block (SSB) according to the rsrp-ThresholdSSB and then may select a RA preamble associated with the selected SSB. The downlink pathloss reference of a Cell could be a downlink reference signaling (and/or a set of downlink reference signaling) associated with the Cell. The downlink reference signaling (and/or the set of downlink reference signaling) associated with the Cell may be associated with the initial downlink BWP of the Cell. The downlink reference signaling (and/or the set of downlink reference signaling) associated with the Cell may be (and/or may comprise) SSB. The downlink reference signaling (and/or the set of downlink reference signaling) associated with the Cell may be (and/or may comprise) CSI-RS.

Considering that EDT and/or one or more mechanisms and/or features similar to EDT may be introduced in NR, an EDT-related configuration (e.g., one or more PRACH resources for EDT and/or one or more RA preambles for EDT) may need to be configured for the UE. If the UE is configured with a SUL carrier (in addition to a NUL carrier), an EDT-related configurations for the SUL carrier and an EDT-related configuration for the NUL carrier may be separated and/or different than each other. For example, one or more PRACH resources for EDT on the SUL carrier may be different than one or more PRACH resources for EDT on the NUL carrier (e.g., the one or more PRACH resources for EDT on the SUL carrier may be different than the one or more PRACH resources for EDT on the NUL carrier due to a frequency band associated with the SUL carrier being different than a frequency band associated with the NUL carrier).

Figure 8:
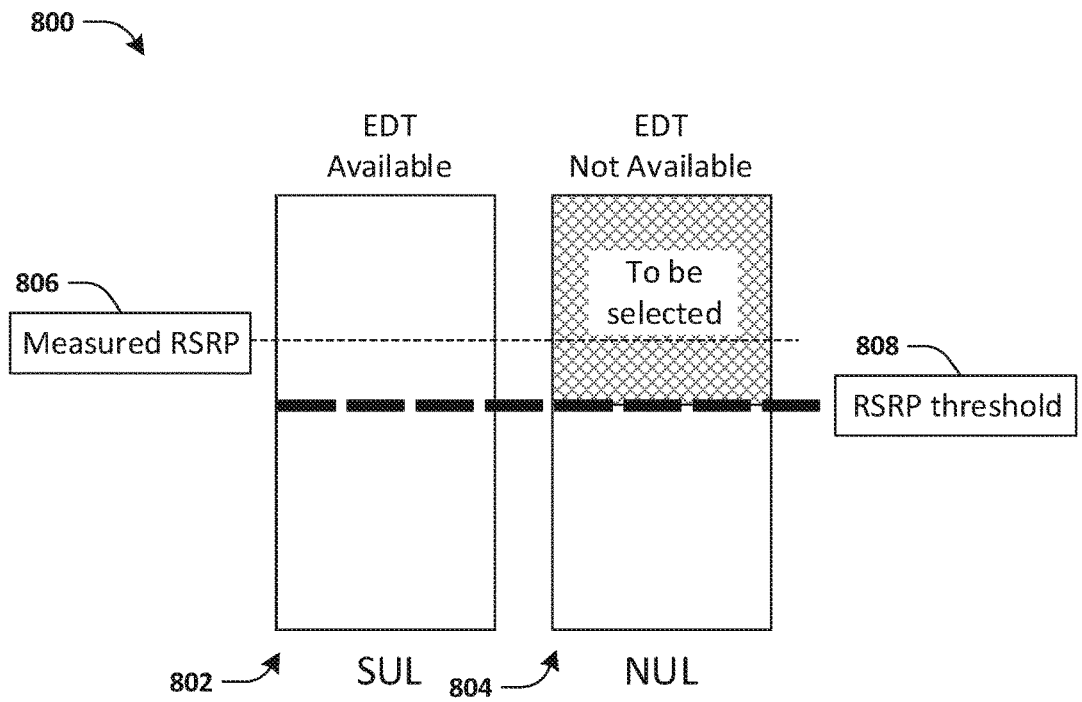
FIG. 8 is a diagram illustrating an exemplary scenario associated with selection of a carrier for EDT according to one exemplary embodiment.

In some embodiments, if the UE determines to use EDT (such as when one or more conditions for initiating EDT are met), the UE may determine PRACH resources used for EDT similar to determining PRACH resources for a normal RA procedure (i.e. non-EDT RA) in NR. The UE may determine whether to select a NUL carrier or a SUL carrier for EDT (if one or more SUL carriers are configured). In some implementations of a RA procedure in NR, the UE selects a NUL carrier or a SUL carrier (e.g., the UE selects between using a NUL carrier and a SUL carrier for the RA procedure) based on whether the measured RSRP of the downlink pathloss reference is less than a configured RSRP threshold. However, if the UE follows the same method to select a NUL carrier or a SUL carrier for EDT, it may be possible that in some cases EDT cannot be performed on the selected carrier. For example, the UE may check whether one or more conditions for initiating EDT (e.g., the NW provides edt-Parameter in System Information) are met (e.g., whether the one or more conditions are fulfilled) and may initiate the EDT based on a determination that the one or more conditions are met. The UE may select a carrier (such as after initiating the EDT) based on the RSRP threshold during initiation of a RA procedure (e.g., initialization of a RA procedure is discussed in Section 5.1.1 of 3GPP TS 38.321 V15.6.0). During RA Resource selection procedure, such as after selecting the carrier, the UE may determine that there is no PRACH resource for EDT on the selected carrier (e.g., RA Resource selection is discussed in Section 5.1.2 of 3GPP TS 38.321 V15.6.0). An example is shown in FIG. 8. FIG. 8 illustrates an exemplary scenario 800 associated with selection of a carrier for EDT. In the exemplary scenario 800, a UE selects a NUL carrier 804 for EDT based on a measured RSRP 806 and/or a RSRP threshold 2108 while no PRACH resource for EDT is available on the NUL carrier 804. For example, the UE may select the NUL carrier 804 from amongst the NUL carrier 804 and a SUL carrier 802 based on a determination that the measured RSRP 806 is above the RSRP threshold 808.

Techniques are provided herein, which when implemented, solve the aforementioned issues, such as the UE selecting a carrier on which there is no available PRACH resource for EDT.

Embodiment 1

In Embodiment 1, whether there is an EDT-related configuration (e.g., one or more available PRACH resources for EDT) on a corresponding carrier (e.g., a SUL carrier and/or a NUL carrier) is taken into account when the UE determines to select a SUL carrier or a NUL carrier for EDT.

The UE may determine whether to select a carrier (e.g., a SUL carrier or a NUL carrier) for EDT from amongst one or more SUL carriers and one or more NUL carriers based on whether an EDT-related configuration is available on the carrier(s).

For example, the UE determines to select a SUL carrier for EDT from amongst the SUL carrier and a NUL carrier if the SUL carrier is configured with one or more PRACH resources for EDT and the NUL carrier is not configured with one or more PRACH resources for EDT. Alternatively and/or additionally, the UE determines to select a NUL carrier for EDT from amongst a SUL carrier and the NUL carrier if the NUL carrier is configured with one or more PRACH resources for EDT and the SUL carrier is not configured with one or more PRACH resources for EDT.

In some embodiments, in a scenario in which the SUL carrier is configured with one or more PRACH resources for EDT and the NUL carrier is not configured with one or more PRACH resources for EDT, the UE selects the SUL carrier for EDT regardless of a measured RSRP of a downlink pathloss reference.

Figure 9:
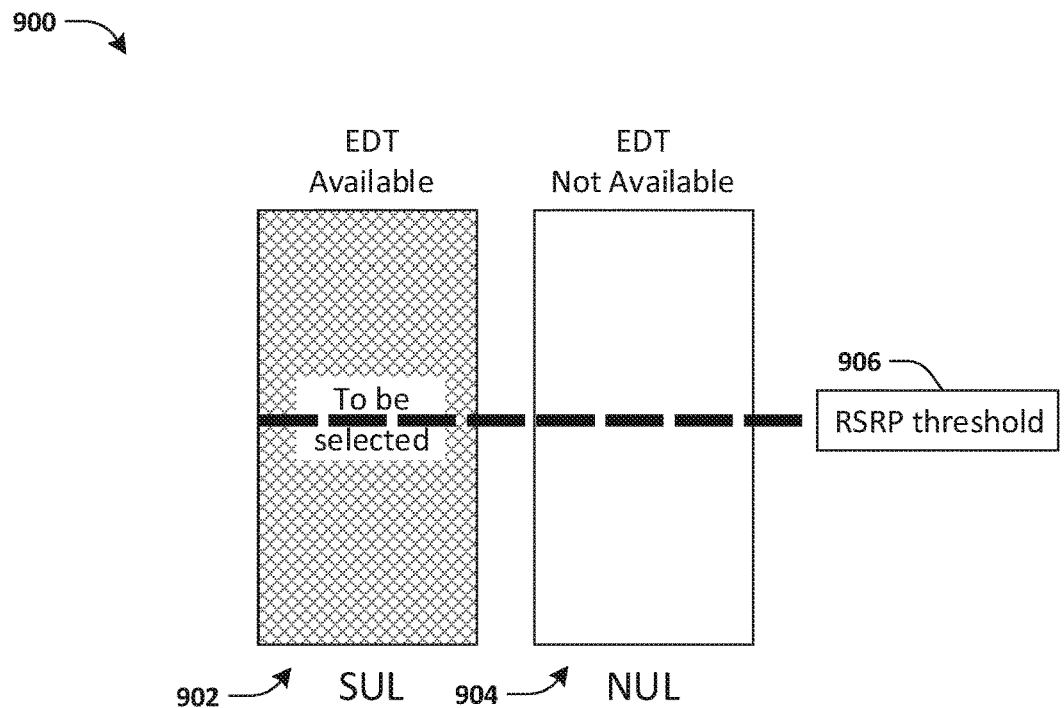
FIG. 9 is a diagram illustrating an exemplary scenario associated with selection of a carrier for EDT according to one exemplary embodiment.

FIG. 9 illustrates an exemplary scenario 900 associated with selection of a carrier for EDT. The UE may select a SUL carrier 902 for EDT from amongst the SUL carrier 902 and a NUL carrier 904 based on a determination that an EDT-related configuration is available on the SUL carrier 902 and/or that an EDT-related configuration is not available on the NUL carrier 904 (and/or based on a determination that the SUL carrier 902 is configured with one or more PRACH resources for EDT and/or that the NUL carrier 904 is not configured with one or more PRACH resources for EDT). The selection of the SUL carrier 902 may be performed regardless of a measured RSRP of a downlink pathloss reference. For example, the selection of the SUL carrier 902 may be performed without comparing the measured RSRP with a RSRP threshold 906 based on a determination that the EDT-related configuration is available on the SUL carrier 902 and/or that an EDT-related configuration is not available on the NUL carrier 904 (and/or based on a determination that the SUL carrier 902 is configured with one or more PRACH resources for EDT and/or that the NUL carrier 904 is not configured with one or more PRACH resources for EDT).

In some embodiments, the UE may select a carrier (e.g., a SUL carrier or a NUL carrier) for EDT based on the measured RSRP and/or a first threshold. The UE may select the SUL carrier or the NUL carrier for EDT based on the measured RSRP and/or the first threshold in a scenario in which an EDT-related configuration is available on the SUL carrier and an EDT-related configuration is available on the NUL carrier. For example, the UE may select the SUL carrier or the NUL carrier for EDT based on the measured RSRP and/or the first threshold in a scenario in which the SUL carrier is configured with one or more PRACH resources for EDT and the NUL carrier is configured with one or more PRACH resources for EDT.

Figure 10:
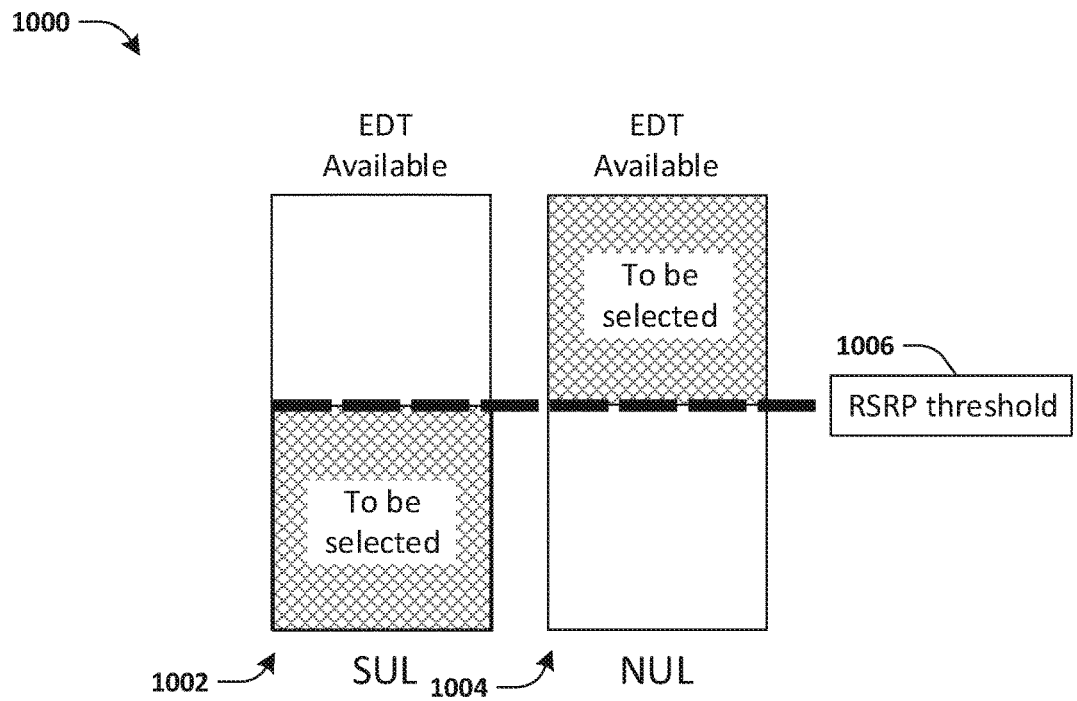
FIG. 10 is a diagram illustrating an exemplary scenario associated with selection of a carrier for EDT according to one exemplary embodiment.

FIG. 10 illustrates an exemplary scenario 1000 associated with selection of a carrier for EDT. The UE may select one of a SUL carrier 1002 or a NUL carrier 1004 for EDT based on a measured RSRP of a downlink pathloss reference and/or a RSRP threshold 1006 (e.g., the first threshold). The measured RSRP and/or the RSRP threshold 1006 may be used for selecting a carrier based on a determination that an EDT-related configuration is available on the SUL carrier 1002 and that an EDT-related configuration is available on the NUL carrier 1004 (and/or based on a determination that the SUL carrier 1002 is configured with one or more PRACH resources for EDT and that the NUL carrier 1004 is configured with one or more PRACH resources for EDT).

In some embodiments, the UE may select a carrier (e.g., a SUL carrier or a NUL carrier) for EDT based on the measured RSRP and/or the first threshold in a scenario in which an EDT-related configuration is not available on the SUL carrier and an EDT-related configuration is not available on the NUL carrier. For example, the UE may select the SUL carrier or the NUL carrier for EDT based on the measured RSRP and/or the first threshold in a scenario in which the SUL carrier is not configured with one or more PRACH resources for EDT and the NUL carrier is not configured with one or more PRACH resources for EDT.

In some embodiments, the UE may select a carrier (e.g., a SUL carrier or a NUL carrier) for EDT based on the measured RSRP and/or the first threshold in a scenario in which an EDT-related configuration is not available on the SUL carrier and an EDT-related configuration is available on the NUL carrier. For example, the UE may select the SUL carrier or the NUL carrier for EDT based on the measured RSRP and/or the first threshold in a scenario in which the SUL carrier is not configured with one or more PRACH resources for EDT and the NUL carrier is configured with one or more PRACH resources for EDT.

Figure 11:
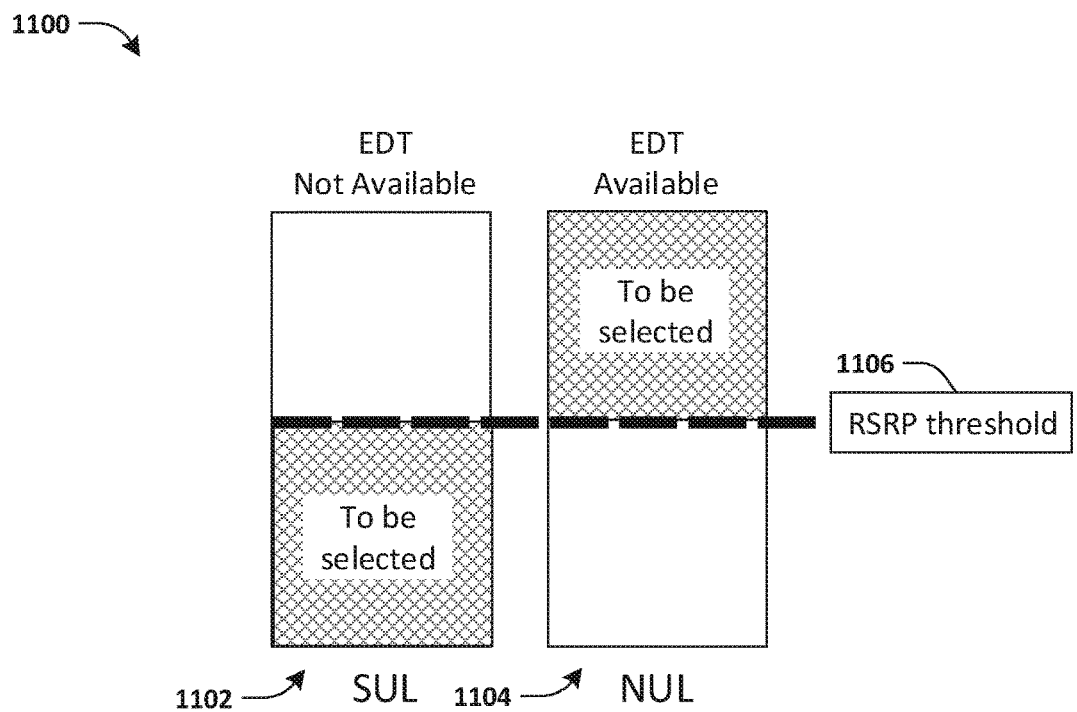
FIG. 11 is a diagram illustrating an exemplary scenario associated with selection of a carrier for EDT according to one exemplary embodiment.

FIG. 11 illustrates an exemplary scenario 1100 associated with selection of a carrier for EDT. The UE may select one of a SUL carrier 1102 or a NUL carrier 1104 for EDT based on a measured RSRP of a downlink pathloss reference and/or a RSRP threshold 1106 (e.g., the first threshold). The measured RSRP and/or the RSRP threshold 1106 may be used for selecting a carrier based on a determination that an EDT-related configuration is not available on the SUL carrier 1102 and that an EDT-related configuration is available on the NUL carrier 1104 (and/or based on a determination that the SUL carrier 1102 is not configured with one or more PRACH resources for EDT and that the NUL carrier 1104 is configured with one or more PRACH resources for EDT).

In some embodiments, the UE may select a carrier (e.g., a SUL carrier or a NUL carrier) for EDT based on the measured RSRP and/or one or more thresholds. In an example, the UE may select the SUL carrier for EDT based on a determination that one or more second conditions associated are met. The one or more second conditions may comprise a fourth condition that the SUL carrier is configured with one or more PRACH resources for EDT and the NUL carrier is not configured with one or more PRACH resources for EDT. The one or more second conditions may comprise a fifth condition that the measured RSRP is not less than the first threshold (and/or a different threshold) of the one or more thresholds and that the measured RSRP is less than a second threshold of the one or more thresholds. In some embodiments, the UE may select the SUL carrier for EDT based on a determination that both the fourth condition and the fifth condition are met. Alternatively and/or additionally, the UE may select the NUL carrier for EDT based on a determination that at least one condition of the one or more second conditions (e.g., at least one of the fourth condition or the fifth condition) is not met.

In some embodiments, the UE may select a carrier (e.g., a SUL carrier or a NUL carrier) for EDT based on the measured RSRP and/or one or more thresholds. In an example, the UE may select the NUL carrier for EDT based on a determination that one or more third conditions are met. The one or more third conditions may comprise a sixth condition that the NUL carrier is configured with one or more PRACH resources for EDT and the SUL carrier is not configured with one or more PRACH resources for EDT. The one or more third conditions may comprise a seventh condition that the measured RSRP is less than the first threshold (and/or a different threshold) of the one or more thresholds and that the measured RSRP is not less than a third threshold of the one or more thresholds. In some embodiments, the UE may select the NUL carrier for EDT based on a determination that both the sixth condition and the seventh condition are met. Alternatively and/or additionally, the UE may select the SUL carrier for EDT based on a determination that at least one condition of the one or more third conditions (e.g., at least one of the sixth condition or the seventh condition) is not met.

In some embodiments, in a scenario in which the SUL carrier is configured with one or more PRACH resources for EDT and the NUL carrier is not configured with one or more PRACH resources for EDT, the UE may select the SUL carrier for EDT if the measured RSRP is less than the second threshold (and/or a different threshold). Alternatively and/or additionally, in the scenario, the UE may select the NUL carrier for EDT if the measured RSRP is not less than the second threshold (and/or the different threshold).

In some embodiments, in a scenario in which the NUL carrier is configured with one or more PRACH resources for EDT and the SUL carrier is not configured with one or more PRACH resources for EDT, the UE may select the SUL carrier for EDT if the measured RSRP is less than the third threshold (and/or a different threshold). Alternatively and/or additionally, in the scenario, the UE may select the NUL carrier for EDT if the measured RSRP is not less than the third threshold (and/or the different threshold).

In some embodiments, in a scenario in which the NUL carrier is configured with one or more PRACH resources for EDT and the SUL carrier is configured with one or more PRACH resources for EDT, the UE may select the SUL carrier for EDT if the measured RSRP is less than the first threshold (and/or a different threshold). Alternatively and/or additionally, in the scenario, the UE may select the NUL carrier for EDT if the measured RSRP is not less than the first threshold (and/or the different threshold).

In some embodiments, in a scenario in which the NUL carrier is not configured with one or more PRACH resources for EDT and the SUL carrier is not configured with one or more PRACH resources for EDT, the UE may select the SUL carrier for EDT if the measured RSRP is less than the first threshold (and/or a different threshold). Alternatively and/or additionally, in the scenario, the UE may select the NUL carrier for EDT if the measured RSRP is not less than the first threshold (and/or the different threshold).

In some embodiments, the first threshold is a RSRP threshold, such as rsrp-ThresholdSSB-SUL. Alternatively and/or additionally, the first threshold may be different than rsrp-ThresholdSSB-SUL. In some embodiments, the first threshold may be a new threshold configured in EDT configuration. In some embodiments, the second threshold and/or the third threshold may be the same as the first threshold. Alternatively and/or additionally, the second threshold and/or the third threshold may be different than the first threshold. In some embodiments, the second threshold and/or the third threshold may be configured in EDT configuration. In some embodiments, a value of the first threshold may be equal to or less than the second threshold. In some embodiments, the value of the first threshold may be equal to or higher than the third threshold.

In some embodiments, the UE may determine not to cancel EDT if at least one of the SUL carrier or the NUL carrier is configured with one or more PRACH resources for EDT. In some embodiments, the UE may determine to cancel EDT if neither the SUL carrier nor the NUL carrier is configured with one or more PRACH resources for EDT. The UE may determine to cancel EDT if the selected carrier (e.g., the SUL carrier or the NUL carrier selected by the UE for EDT) is not configured with one or more PRACH resources for EDT.

Embodiment 2

In Embodiment 2, the UE may cancel EDT and/or fallback to non-EDT RA after selecting a carrier if the selected carrier is not configured with one or more PRACH resources for EDT. The UE may then perform non-EDT RA on the selected carrier.

The UE may determine whether there are one or more available PRACH resources for EDT after selecting a carrier (e.g., a SUL carrier or a NUL carrier). For example, if the UE selects a SUL carrier to be used for the RA procedure (e.g., EDT RA), the UE may then determine whether there are one or more available PRACH resources for EDT on the SUL carrier. The UE may determine to cancel EDT if the SUL carrier is not configured with one or more PRACH resources for EDT. For example, the UE may cancel EDT responsive to a determination that the SUL carrier is not configured with one or more PRACH resources for EDT. Alternatively and/or additionally, the UE may determine not to cancel EDT if the SUL carrier is configured with one or more PRACH resources for EDT. For example, the UE may not cancel EDT (and/or may perform EDT) responsive to a determination that the SUL carrier is configured with one or more PRACH resources for EDT.

Alternatively and/or additionally, if the UE selects a NUL carrier to be used for the RA procedure (e.g., EDT RA), the UE may then determine whether there are one or more available PRACH resources for EDT on the NUL carrier. The UE may determine to cancel EDT if the NUL carrier is not configured with one or more PRACH resources for EDT. For example, the UE may cancel EDT responsive to a determination that the NUL carrier is not configured with one or more PRACH resources for EDT. Alternatively and/or additionally, the UE may determine not to cancel EDT if the NUL carrier is configured with one or more PRACH resources for EDT. For example, the UE may not cancel EDT (and/or may perform EDT) responsive to a determination that the NUL carrier is configured with one or more PRACH resources for EDT.

Alternatively and/or additionally, the UE may determine whether there are one or more available PRACH resources for EDT before selecting a SSB. For example, prior to selecting a SSB, the UE may determine that there are one or more available PRACH resources for EDT and/or the UE may not cancel EDT. The UE may then select a SSB based on (and/or according to) a threshold, such as rsrp-ThresholdSSB. The SSB may be selected (and/or the UE may not cancel EDT) responsive to determining that there are one or more available PRACH resources for EDT.

Alternatively and/or additionally, prior to selecting a SSB, the UE may determine that there is no available PRACH resource for EDT and/or the UE may cancel EDT. The UE may then select a SSB based on (and/or according to) a threshold, such as rsrp-ThresholdSSB. The SSB may be selected (and/or the UE may cancel EDT) responsive to determining that there is no available PRACH resource for EDT.

Alternatively and/or additionally, the UE may determine whether there are one or more available PRACH resources for EDT after selecting a SSB. For example, the UE may select a SSB based on (and/or according to) a threshold, such as rsrp-ThresholdSSB. In an example, after selecting the SSB, the UE may determine that there are one or more available PRACH resources for EDT. The UE may not cancel EDT based on the determination that there are one or more available PRACH resources for EDT. Alternatively and/or additionally, after selecting the SSB, the UE may determine that there is no available PRACH resource for EDT and/or the UE may cancel EDT. The UE may cancel EDT based on the determination that there is no available PRACH resource for EDT.

Alternatively and/or additionally, the UE may determine whether there are one or more available PRACH resources for EDT during initiation of the RA procedure (e.g., initialization of a RA procedure is discussed in Section 5.1.1 of 3GPP TS 38.321 V15.6.0), and/or may not determine whether there are one or more available PRACH resources for EDT during RA Resource selection procedure (e.g., RA Resource selection is discussed in Section 5.1.2 of 3GPP TS 38.321 V15.6.0). Alternatively and/or additionally, the UE may determine whether there are one or more available PRACH resources for EDT during RA Resource selection procedure, and/or may not determine whether there are one or more available PRACH resources for EDT during initiation of the RA procedure.

In some embodiments, the UE may determine whether there are one or more available PRACH resources for EDT once during a RA procedure. Alternatively and/or additionally, the UE may determine whether there are one or more available PRACH resources for EDT multiple times during a RA procedure.

Embodiment 3

In Embodiment 3, a network may configure EDT for neither the SUL carrier nor the NUL carrier, the network may configure EDT for both of the SUL carrier and the NUL carrier (in a scenario in which the SUL carrier is configured), or the network may configure EDT for the NUL carrier but not for the SUL carrier.

In some embodiments, the network may configure one or more PRACH resources for EDT on a Serving Cell such that: (1) both the SUL carrier and the NUL carrier are configured with one or more PRACH resources for EDT, (2) neither the SUL carrier nor the NUL carrier is configured with one or more PRACH resources for EDT, or (3) the NUL carrier is configured with one or more PRACH resources for EDT and the SUL carrier (in a scenario in which the SUL carrier is configured) is not configured with one or more PRACH resources for EDT.

In some embodiments, if the network configures a serving cell with the SUL carrier and the NUL carrier, the network may not configure one or more PRACH resources for EDT on the serving cell such that one carrier, of the SUL carrier and the NUL carrier, is configured with one or more PRACH resources for EDT and another carrier, of the SUL carrier and the NUL carrier, is not configured with one or more PRACH resources for EDT (e.g., the network may not be allowed, configured and/or enabled to configure one or more PRACH resources for EDT on the serving cell such that the one carrier is configured with one or more PRACH resources for EDT and the another carrier is not configured with one or more PRACH resources for EDT). In an example, the one carrier may correspond to the SUL carrier and the another carrier may correspond to the NUL carrier. Alternatively and/or additionally, the one carrier may correspond to the NUL carrier and the another carrier may correspond to the SUL carrier.

In some embodiments, if the network configures a serving cell with the SUL carrier and the NUL carrier, the network may not configure one or more PRACH resources for EDT on the serving cell such that the SUL carrier is configured with one or more PRACH resources for EDT and the NUL carrier is not configured with one or more PRACH resources for EDT (e.g., the network may not be allowed, configured and/or enabled to configure one or more PRACH resources for EDT on the serving cell such that the SUL carrier is configured with one or more PRACH resources for EDT and the NUL carrier is not configured with one or more PRACH resources for EDT). Rather, if the network configures a serving cell with the SUL carrier and the NUL carrier, the network may configure (and/or may be allowed, configured and/or enabled to configure) one or more PRACH resources for EDT on the serving cell such that the NUL carrier is configured with one or more PRACH resources for EDT and the SUL carrier is not configured with one or more PRACH resources for EDT (or the network may configure one or more PRACH resources for EDT on the serving cell such that both the SUL carrier and the NUL carrier are configured with one or more PRACH resources for EDT and/or such that neither the SUL carrier nor the NUL carrier is configured with one or more PRACH resources for EDT).

In some embodiments, an EDT configuration (e.g., one or more PRACH resources for EDT) may be configured per Serving Cell (rather and/or in addition to than per carrier) (e.g., an EDT configuration may be configured for a Serving Cell). The UE may determine whether there are one or more available PRACH resources for EDT before the UE selects the SUL carrier or the NUL carrier. The UE may derive one or more PRACH resources for EDT on the selected carrier after selecting the SUL carrier or the NUL carrier (and/or after determining that there are one or more available PRACH resources for EDT on the selected carrier). For example, the one or more PRACH resources for EDT may be derived using a frequency location of the selected carrier. In some embodiments, an EDT configuration of a Cell is applicable to the NUL carrier and is not applicable to the SUL carrier.

In some embodiments, the UE may determine whether there are one or more available PRACH resources for EDT on a Serving Cell. The UE may then select a SUL carrier or a NUL carrier based on a threshold. In some embodiments, the threshold is a RSRP threshold, such as rsrp-Threshold-SSB-SUL. Alternatively and/or additionally, the threshold may be different than rsrp-ThresholdSSB-SUL. In some embodiments, the threshold may be a new threshold configured in EDT configuration. The UE may determine not to initiate EDT if the Serving Cell is not configured with one or more PRACH resources for EDT (e.g., the UE may determine not to initiate EDT if there are no available PRACH resources for EDT on the Serving Cell). The UE may determine to cancel EDT if the Serving Cell is not configured with one or more PRACH resources for EDT (e.g., the UE may determine to cancel EDT if there are no available PRACH resources for EDT on the Serving Cell). The UE may determine to initiate EDT if the Serving Cell is configured with one or more PRACH resources for EDT (e.g., the UE may determine to initiate EDT if there are one or more available PRACH resources for EDT on the Serving Cell). The UE may determine not to cancel EDT if the Serving Cell is configured with one or more PRACH resources for EDT (e.g., the UE may determine not to cancel EDT if there are one or more available PRACH resources for EDT on the Serving Cell).

Alternatively and/or additionally, the network may configure (and/or may be allowed, configured and/or enabled to configure) one or more PRACH resources for EDT on a SUL carrier of a Serving Cell if the network configures one or more PRACH resources for EDT on a NUL carrier of the Serving Cell. Alternatively and/or additionally, the network may not configure (and/or may not be allowed, configured and/or enabled to configure) one or more PRACH resources for EDT on a SUL carrier of a Serving Cell if the network does not configure one or more PRACH resources for EDT on a NUL carrier of the Serving Cell. For example, if an EDT configuration (e.g., one or more PRACH resources for EDT) for a NUL carrier of a Serving Cell is configured, an EDT configuration (e.g., one or more PRACH resources for EDT) for a SUL carrier of the Serving Cell may also be configured.

Alternatively and/or additionally, the network may configure (and/or may be allowed, configured and/or enabled to configure) one or more PRACH resources for EDT on a NUL carrier of a Serving Cell if the network configures one or more PRACH resources for EDT on a SUL carrier of the Serving Cell. Alternatively and/or additionally, the network may not configure (and/or may not be allowed, configured and/or enabled to configure) one or more PRACH resources for EDT on a NUL carrier of a Serving Cell if the network does not configure one or more PRACH resources for EDT on a SUL carrier of the Serving Cell. For example, if an EDT configuration (e.g., one or more PRACH resources for EDT) for a SUL carrier of a Serving Cell is configured, an EDT configuration (e.g., one or more PRACH resources for EDT) for a NUL carrier of the Serving Cell may also be configured.

Alternatively and/or additionally, the UE may determine whether there are one or more available PRACH resources for EDT during initiation of a RA procedure (e.g., initialization of a RA procedure is discussed in Section 5.1.1 of 3GPP TS 38.321 V15.6.0), and/or may not determine whether there are one or more available PRACH resources for EDT during RA Resource selection procedure (e.g., RA Resource selection is discussed in Section 5.1.2 of 3GPP TS 38.321 V15.6.0).

In some embodiments, the UE may determine whether there are one or more available PRACH resources for EDT once during a RA procedure. Alternatively and/or additionally, the UE may determine whether there are one or more available PRACH resources for EDT multiple times during a RA procedure.

Embodiment 4

In Embodiment 4, EDT may be performed on a specific carrier, such as a SUL carrier or a NUL carrier (e.g., EDT may be performed only and/or exclusively on the specific carrier).

For NR_Lite, it may be possible that EDT is only supported on one carrier of the SUL carrier and the NUL carrier and is not supported on another carrier of the SUL carrier and the NUL carrier. "Supported" implies that an EDT procedure may be performed on the one carrier, but does not imply that one or more PRACH resources for EDT are always available (i.e., configured) on the one carrier. In other words, even if EDT is supported on a carrier (e.g., the SUL carrier or the NUL carrier), if the network does not configure one or more PRACH resources for EDT on the carrier, the UE cannot (and/or may not be allowed, configured and/or enabled to) perform an EDT procedure on the carrier.

In some embodiments, EDT is supported on the NUL carrier and is not supported on the SUL carrier. If the UE selects the NUL carrier, the UE may determine whether there are one or more available PRACH resources for EDT on the NUL carrier. If the UE selects the SUL carrier, the UE may cancel EDT accordingly and/or may not check whether there are one or more available PRACH resources for EDT on the SUL carrier (such as due to EDT not being supported on the SUL carrier).

In some embodiments, EDT is supported on the SUL carrier and is not supported on the NUL carrier. If the UE selects the SUL carrier, the UE may determine whether there are one or more available PRACH resources for EDT on the SUL carrier. If the UE selects the NUL carrier, the UE may cancel EDT accordingly and/or may not check whether there are one or more available PRACH resources for EDT on the NUL carrier (such as due to EDT not being supported on the NUL carrier).

Alternatively and/or additionally, the UE may determine whether there are one or more available PRACH resources for EDT before selecting a SSB. For example, prior to selecting a SSB, the UE may determine that there are one or more available PRACH resources for EDT and/or the UE may not cancel EDT. The UE may then select a SSB based on (and/or according to) a threshold, such as rsrp-ThresholdSSB. The SSB may be selected (and/or the UE may not cancel EDT) responsive to determining that there are one or more available PRACH resources for EDT.

Alternatively and/or additionally, prior to selecting a SSB, the UE may determine that there is no available PRACH resource for EDT and/or the UE may cancel EDT. The UE may then select a SSB based on (and/or according to) a threshold, such as rsrp-ThresholdSSB. The SSB may be selected (and/or the UE may cancel EDT) responsive to determining that there is no available PRACH resource for EDT.

Alternatively and/or additionally, the UE may determine whether there are one or more available PRACH resources for EDT after selecting a SSB. For example, the UE may select a SSB based on (and/or according to) a threshold, such as rsrp-ThresholdSSB. In an example, after selecting the SSB, the UE may determine that there are one or more available PRACH resources for EDT. The UE may not cancel EDT based on the determination that there are one or more available PRACH resources for EDT. Alternatively and/or additionally, after selecting the SSB, the UE may determine that there is no available PRACH resource for EDT and/or the UE may cancel EDT. The UE may cancel EDT based on the determination that there is no available PRACH resource for EDT.

Alternatively and/or additionally, the UE may determine whether there are one or more available PRACH resources for EDT during initiation of the RA procedure (e.g., initialization of a RA procedure is discussed in Section 5.1.1 of 3GPP TS 38.321 V15.6.0), and/or may not determine whether there are one or more available PRACH resources for EDT during RA Resource selection procedure (e.g., RA Resource selection is discussed in Section 5.1.2 of 3GPP TS 38.321 V15.6.0). Alternatively and/or additionally, the UE may determine whether there are one or more available PRACH resources for EDT during RA Resource selection procedure, and/or may not determine whether there are one or more available PRACH resources for EDT during initiation of the RA procedure.

In some embodiments, the UE may determine whether there are one or more available PRACH resources for EDT once during a RA procedure. Alternatively and/or additionally, the UE may determine whether there are one or more available PRACH resources for EDT multiple times during a RA procedure.

One, some and/or all of the foregoing techniques and/or embodiments and/or others provided herein can be formed to a new embodiment.

In some examples, embodiments disclosed herein, such as embodiments described with respect to Embodiment 1, Embodiment 2, Embodiment 3 and Embodiment 4, may be implemented independently and/or separately. Alternatively and/or additionally, a combination of two or more of the embodiments disclosed herein, such as embodiments described with respect to Embodiment 1, Embodiment 2, Embodiment 3 and/or Embodiment 4, may be implemented. Alternatively and/or additionally, a combination of two or more of the embodiments disclosed herein, such as embodiments described with respect to Embodiment 1, Embodiment 2, Embodiment 3 and/or Embodiment 4, may be implemented concurrently and/or simultaneously.

Various techniques of the present disclosure may be performed independently and/or separately from one another. Alternatively and/or additionally, various techniques of the present disclosure may be combined and/or implemented using a single system. Alternatively and/or additionally, various techniques of the present disclosure may be implemented concurrently and/or simultaneously.

One, some and/or all of the foregoing techniques and/or embodiments and/or others provided herein may be applied for performing EDT initiated in RRC_IDLE state. One, some and/or all of the foregoing techniques and/or embodiments and/or others provided herein may be applied for performing EDT initiated in RRC_INACTIVE state. One, some and/or all of the foregoing techniques and/or embodiments and/or others provided herein may be applied for performing Control Plane EDT (CP-EDT). In some embodiments, CP-EDT could be initiated in RRC_IDLE state. Alternatively and/or additionally, CP-EDT could be initiated in RRC_INACTIVE state. One, some and/or all of the foregoing techniques and/or embodiments and/or others provided herein may be applied for performing User Plane EDT (UP-EDT). In some embodiments, UP-EDT could be initiated in RRC_IDLE state. Alternatively and/or additionally, UP-EDT could be initiated in RRC_INACTIVE state.

In one, some and/or all of the foregoing techniques and/or embodiments and/or others provided herein, the UE may be a NR_Lite UE (and/or a different type of UE). In one, some and/or all of the foregoing techniques and/or embodiments and/or others provided herein, the network may be a gNB (and/or a different type of network).

In some embodiments, the network may configure different and/or separated parameters for EDT on a SUL carrier and a NUL carrier. For example, the network may configured one or more first parameters for EDT on the SUL carrier and/or one or more second parameters for EDT on the NUL carrier, where the one or more first parameters are different than and/or separated from the one or more second parameters. In some embodiments, one or more parameters for EDT are shared between the SUL carrier and the NUL carrier. For example, the one or more first parameters associated with the SUL carrier may comprise one or more parameters that match the one or more second parameters associated with the NUL carrier (and/or the one or more first parameters and the one or more second parameters may both comprise one or more common parameters). In some embodiments, an EDT configuration may comprise one or more parameters for EDT. The one or more parameters for EDT may comprise one or more PRACH resources for EDT. The one or more parameters for EDT may be indicative of a type of supported EDT (e.g., CP-EDT and/or UP-EDT). The one or more parameters for EDT may comprise a TB size (e.g., a threshold TB size and/or a maximum TB size) of Msg3 (and/or a different message) in EDT RA. The one or more parameters for EDT may comprise a set of RA preambles for EDT. The one or more parameters for EDT may comprise a timer (e.g., mac-ContentionResolutionTimer) for EDT. The one or more parameters for EDT may be associated with a Serving Cell.

In some embodiments, one or more fourth conditions of initiating EDT in NR_Lite may be similar to (and/or different than) one or more conditions of initiating EDT in LTE (e.g., conditions for initiating EDT in LTE are discussed in Section 5.3.3.1b of 3GPP TS 36.331 V15.6.0). In some embodiments, the one or more fourth conditions of initiating EDT in NR_Lite may comprise an eighth condition that support of EDT is indicated by the network (e.g., an indication that the network supports EDT may be provided via and/or comprised in system information). Alternatively and/or additionally, the one or more fourth conditions may comprise a ninth condition that the UE supports EDT. Alternatively and/or additionally, the one or more fourth conditions may comprise a tenth condition that initiation of EDT is requested by one or more upper layers (e.g., connection establishment and/or resumption). Alternatively and/or additionally, the one or more fourth conditions may comprise an eleventh condition that the UE has stored (such as before initiation of EDT or at a different time) a security related parameter (e.g., nextHopChainingCount) previously provided by the network (and/or a different network) (e.g., the security related parameter may be provided in a RRC connection release message with suspend indication). Alternatively and/or additionally, the one or more fourth conditions may comprise a twelfth condition that the connection establishment and/or resumption is for one or more first causes (e.g., at least one of mobile originating call, delay tolerant access, etc.). Alternatively and/or additionally, the one or more fourth conditions may comprise a thirteenth condition that an EDT-related configuration is provided (e.g., the EDT-related configuration may be provided via and/or comprised in system information). The EDT-related configuration may be associated with a SUL carrier and/or a NUL carrier. Alternatively and/or additionally, the one or more fourth conditions may comprise a fourteenth condition that a size of a resulting MAC PDU (e.g., a Msg3 in EDT RA) is expected to be smaller than or equal to a configured threshold (e.g., a threshold TB size, such as edt-TBS). Alternatively and/or additionally, the one or more fourth conditions may comprise a fifteenth condition that an EDT fallback indication (e.g., an indication to fallback to non-EDT) has not been received from a lower layer. In some embodiments, the one or more fourth conditions of initiating EDT in NR_Lite comprises the eighth condition, the ninth condition, the tenth condition, the eleventh condition, the twelfth condition, the thirteenth condition, the fourteenth condition, and/or the fifteenth condition. In some embodiments, the UE may initiate EDT if at least one condition of the one or more fourth conditions are met. In some embodiments, the UE may initiate EDT if all of the one or more fourth conditions are met. In some embodiments, the EDT may be CP-EDT and/or UP-EDT.

For a Serving Cell, the network may ensure that if one or more PRACH resources for EDT are configured for at least one of a SUL carrier or a NUL carrier (e.g., EDT may be allowed, configured and/or enabled in the Serving Cell), both the SUL carrier and the NUL carrier will be configured with one or more PRACH resources for EDT, respectively. For a Serving Cell, the network may ensure that if one or more PRACH resources for EDT are not configured for at least one of a SUL carrier or a NUL carrier (such as in a scenario in which EDT is not allowed, configured and/or enabled in the Serving Cell), neither the SUL carrier nor the NUL carrier will be configured with one or more PRACH resources for EDT.

For a Serving Cell, EDT RA and non-EDT RA on a SUL carrier may share one or more same PRACH resources (e.g., EDT RA on the SUL carrier and non-EDT RA on the SUL carrier may both use the one or more same PRACH resources). For a Serving Cell, EDT RA and non-EDT RA on a SUL carrier may use different PRACH resources (e.g., EDT RA on the SUL carrier may use one or more first PRACH resources and non-EDT RA on the SUL carrier may use the one or more second PRACH resources different than the one or more first PRACH resources). For a Serving Cell, EDT RA and non-EDT RA on a NUL carrier may share one or more same PRACH resources (e.g., EDT RA on the NUL carrier and non-EDT RA on the NUL carrier may both use the one or more same PRACH resources). For a Serving Cell, EDT RA and non-EDT RA on a NUL carrier may use different PRACH resources (e.g., EDT RA on the NUL carrier may use one or more first PRACH resources and non-EDT RA on the NUL carrier may use the one or more second PRACH resources different than the one or more first PRACH resources).

The network may indicate support of EDT on a SUL carrier via System Information (e.g., the System Information may comprise an indication that the network supports EDT on the SUL carrier). The network may indicate support of EDT on a NUL carrier via System Information (e.g., the System Information may comprise an indication that the network supports EDT on the NUL carrier). The network may indicate support of EDT via System Information (e.g., System Information may comprise a single indication that applies to both EDT on a SUL carrier and EDT on a NUL carrier, such as indicating that the network supports EDT on both the SUL carrier and the NUL carrier). In some embodiments, an EDT parameter (e.g., the one or more parameters for EDT) may be provided via a System Information Block Type 1 (i.e. SIB1). In some embodiments, an EDT parameter (e.g., the one or more parameters for EDT) may be provided via a System Information Block Type 2 (i.e. SIB2).

In some embodiments, the UE supports EDT on a SUL carrier. In some embodiments, the UE does not support EDT on a SUL carrier. In some embodiments, the UE optionally supports EDT on a SUL carrier. In some embodiments, the UE mandatorily supports EDT on a SUL carrier. In some embodiments, the UE supports EDT on a NUL carrier. In some embodiments, the UE does not support EDT on a NUL carrier. In some embodiments, the UE optionally supports EDT on a NUL carrier. In some embodiments, the UE mandatorily supports EDT on a NUL carrier.

A SUL carrier of a Serving Cell may refer to a SUL carrier configured in an Uplink BWP of the Serving Cell, such as an initial Uplink BWP of the Serving Cell. A NUL carrier of a Serving Cell may refer to a NUL carrier configured in an Uplink BWP of the Serving Cell, such as an initial Uplink BWP of the Serving Cell.

The term "measured RSRP" in the foregoing description and/or other parts of the present disclosure may refer to a measured RSRP of a downlink pathloss reference of a Cell, such as specified in the present disclosure.

Figure 12:
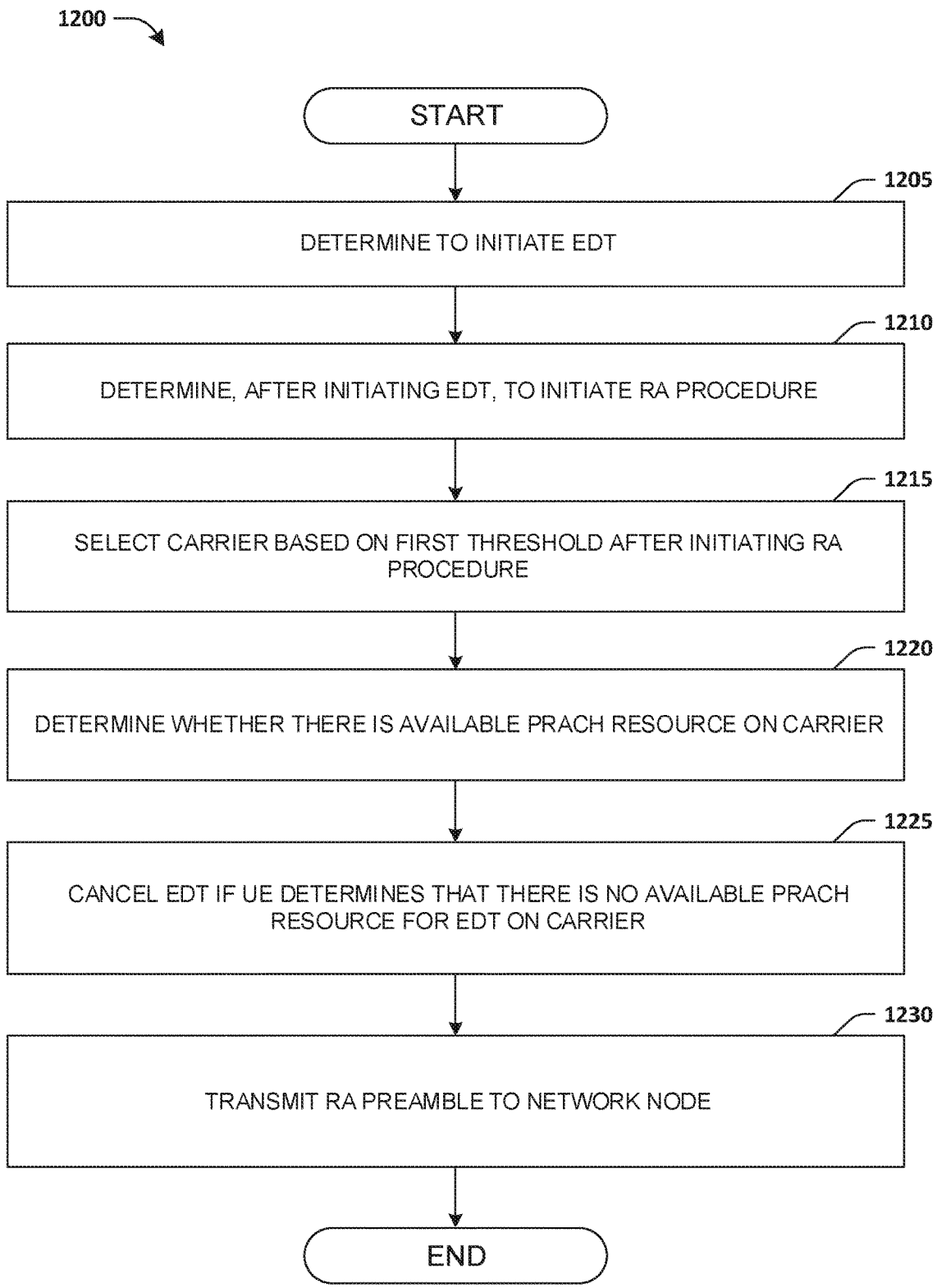
FIG. 12 is a flow chart according to one exemplary embodiment.

FIG. 12 is a flow chart 1200 according to one exemplary embodiment from the perspective of a UE. In step 1205, the UE determines to initiate EDT. In step 1210, the UE determines, after initiating the EDT, to initiate a RA procedure. In some embodiments, the UE determines to initiate the RA procedure responsive to determining to initiate the EDT. In step 1215, the UE selects a carrier based on a first threshold after initiating the RA procedure. In some embodiments, the UE selects the carrier responsive to initiating the RA procedure. In step 1220, the UE determines whether there are one or more available PRACH resources on the carrier. In step 1225, the UE cancels the EDT if the UE determines that there is no available PRACH resource for EDT on the carrier. In step 1230, the UE transmits a RA preamble to a network node.

In one embodiment, the UE does not cancel the EDT if the UE determines that there are one or more available PRACH resources for EDT on the carrier (e.g., the step 1220 may not be performed if the UE determines that there are one or more available PRACH resources for EDT on the carrier). The UE may transmit the RA preamble to the network node.

In one embodiment, the UE selects a SSB based on a second threshold after selecting the carrier and before transmitting the RA preamble.

In one embodiment, the UE selects the SSB before determining whether there are one or more available PRACH resources on the carrier.

In one embodiment, the UE selects the SSB after determining whether there are one or more available PRACH resources on the carrier.

In one embodiment, the RA preamble is associated with the SSB.

In one embodiment, the UE selects the SSB from among a set of SSBs.

In one embodiment, if at least one SSB of the set of SSBs is with RSRP above the second threshold, the SSB selected by the UE is with RSRP above the second threshold. For example, the UE may select the SSB from the set of SSBs based on a determination that the SSB is with the RSRP above the second threshold.

In one embodiment, if no SSB among the set of SSBs is with RSRP above the second threshold, the SSB selected by the UE is with RSRP not above the second threshold.

In one embodiment, the second threshold is a RSRP threshold.

In one embodiment, the second threshold is rsrp-ThresholdSSB.

In one embodiment, the UE determines whether there are one or more available PRACH resources associated with the SSB selected by the UE.

In one embodiment, the UE selects a first carrier (e.g., a SUL carrier) if the RSRP of a downlink pathloss reference is less than the first threshold.

In one embodiment, the UE selects a second carrier (e.g., a NUL carrier) if the RSRP of the downlink pathloss reference is not less than the first threshold.

In one embodiment, the first threshold is a RSRP threshold.

In one embodiment, the first threshold is rsrp-ThresholdSSB-SUL.

In one embodiment, the UE initiates the EDT and the RA procedure in RRC_IDLE state (e.g., the UE initiates the EDT and the RA procedure when the UE is in the RRC_IDLE state).

In one embodiment, the UE initiates the EDT and the RA procedure in RRC_INACTIVE state (e.g., the UE initiates the EDT and the RA procedure when the UE is in the RRC_INACTIVE state).

In one embodiment, a PRACH resource for EDT is different than a PRACH resource not for EDT.

In one embodiment, a PRACH resource for EDT is the same as a PRACH resource not for EDT.

In one embodiment, the UE transmits the RA preamble using one or more PRACH resources for EDT if the EDT is not canceled.

In one embodiment, the UE transmits the RA preamble using one or more PRACH resources not for EDT if the EDT is canceled.

In one embodiment, the one or more PRACH resources for EDT are the same as the one or more PRACH resources not for EDT.

In one embodiment, the one or more PRACH resources for EDT are different than the one or more PRACH resources not for EDT.

In one embodiment, the RA preamble is associated with EDT if the EDT is not canceled.

In one embodiment, the RA preamble is not associated with EDT if the EDT is canceled.

In one embodiment, the network node is a gNB.

Referring back to FIGS. 3 and 4, in one exemplary embodiment of a UE, the device 300 includes a program code 312 stored in the memory 310. The CPU 308 could execute program code 312 to enable the UE (i) to determine to initiate EDT, (ii) to determine, after initiating the EDT, to initiate a RA procedure, (iii) to select a carrier based on a first threshold after initiating the RA procedure, (iv) to determine whether there are one or more available PRACH resources on the carrier, (v) to cancel the EDT if the UE determines that there is no available PRACH resource for EDT on the selected carrier, and (vi) to transmit a RA preamble to a network node. Furthermore, the CPU 308 can execute the program code 312 to perform one, some and/or all of the above-described actions and steps and/or others described herein.

Figure 13:
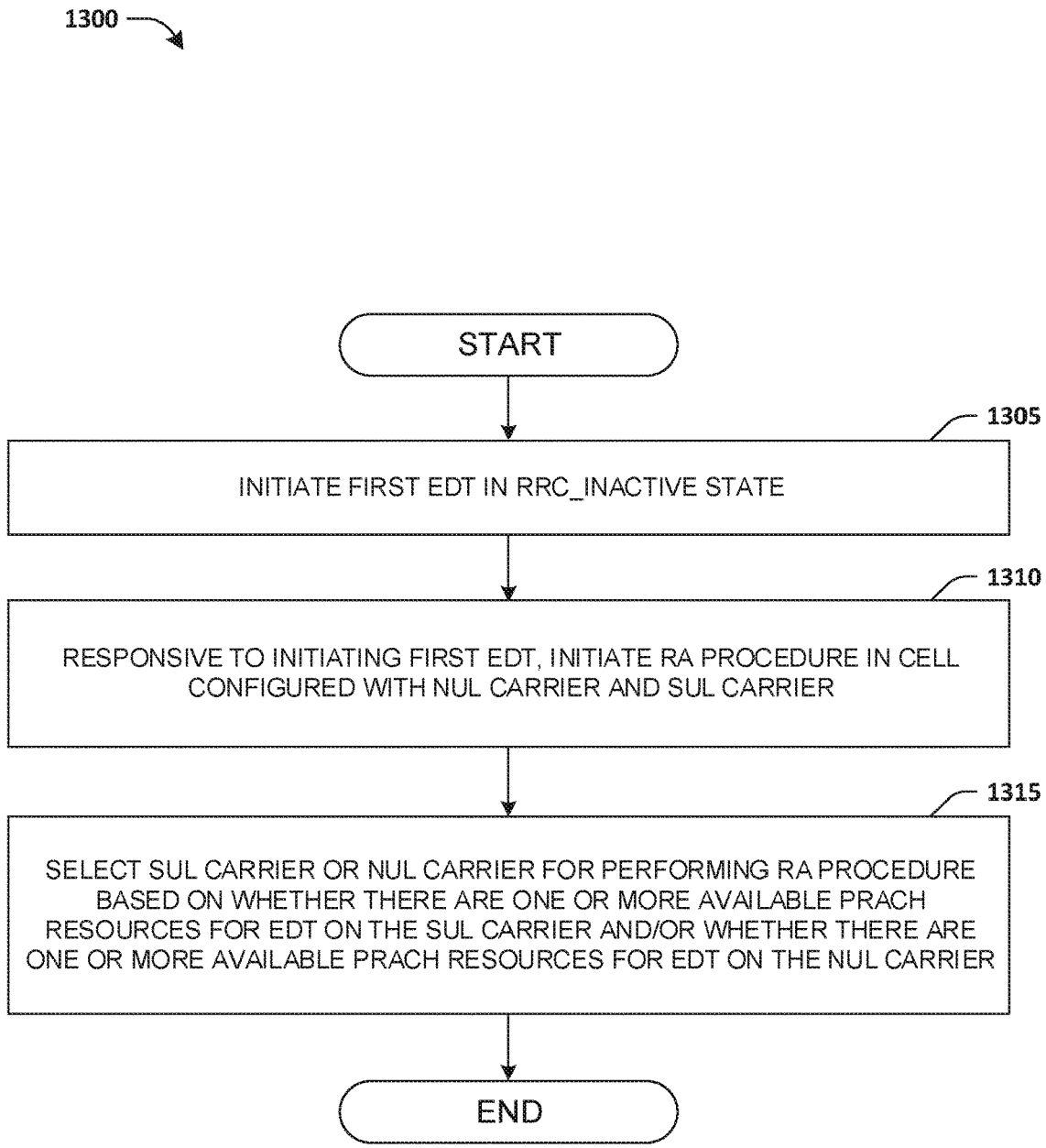
FIG. 13 is a flow chart according to one exemplary embodiment.

FIG. 13 is a flow chart 1300 according to one exemplary embodiment from the perspective of a UE. In step 1305, the UE initiates a first EDT in RRC_INACTIVE state. For example, the UE may initiate the first EDT when the UE is in RRC_INACTIVE state. In step 1310, responsive to initiating the first EDT, the UE initiates a RA procedure in a Cell configured with a NUL carrier and a SUL carrier. In step 1315, the UE selects the SUL carrier or the NUL carrier for performing the RA procedure based on whether there are one or more available PRACH resources for EDT on the SUL carrier and/or whether there are one or more available PRACH resources for EDT on the NUL carrier.

In one embodiment, the UE selects the SUL carrier if there are one or more available PRACH resources for EDT on the SUL carrier and there is no available PRACH resource for EDT on the NUL carrier. For example, the UE may select the SUL carrier for performing the RA procedure based on a determination that there are one or more available PRACH resources for EDT on the SUL carrier and that there is no available PRACH resource for EDT on the NUL carrier.

In one embodiment where there are one or more available PRACH resources for EDT on the SUL carrier and there is no available PRACH resource for EDT on the NUL carrier, the UE selects the SUL carrier regardless of a RSRP of a downlink pathloss reference. For example, the UE may select the SUL carrier without considering the RSRP of the downlink pathloss reference.

In one embodiment where the UE selects the SUL carrier, a RSRP of a downlink pathloss reference is above a first threshold. The first threshold may be a RSRP threshold, such as rsrp-ThresholdSSB-SUL or a different RSRP threshold.

In one embodiment, the UE selects the SUL carrier or the NUL carrier for performing the RA procedure based on a first threshold and a RSRP of a downlink pathloss reference if there are one or more available PRACH resources for EDT on the NUL carrier or if there is no available PRACH resource for EDT on the NUL carrier and the SUL carrier. For example, responsive to a determination that there are one or more available PRACH resources for EDT on the NUL carrier or a determination that there is no available PRACH resource for EDT on the NUL carrier and the SUL carrier, the UE may select the SUL carrier or the NUL carrier based on the first threshold and the RSRP of the downlink pathloss reference. The first threshold may be a RSRP threshold, such as rsrp-ThresholdSSB-SUL or a different RSRP threshold.

In one embodiment where the UE selects the SUL carrier or the NUL carrier based on the first threshold and the RSRP of the downlink pathloss reference, the UE selects the SUL carrier if the RSRP of the downlink pathloss reference is less than the first threshold. For example, the UE may select the SUL carrier based on a determination that the RSRP of the downlink pathloss reference is less than the first threshold.

In one embodiment where the UE selects the SUL carrier or the NUL carrier based on the first threshold and the RSRP of the downlink pathloss reference, the UE selects the NUL carrier if the RSRP of the downlink pathloss reference is not less than the first threshold. For example, the UE may select the NUL carrier based on a determination that the RSRP of the downlink pathloss reference is not less than the first threshold.

In one embodiment, the UE transmits a RA preamble on a selected carrier (e.g., the SUL carrier or the NUL carrier) selected by the UE for performing the RA procedure.

In one embodiment, the UE cancels the first EDT if there is no available PRACH resource for EDT on a selected carrier (e.g., the SUL carrier or the NUL carrier) selected by the UE for performing the RA procedure. For example, the UE may cancel the first EDT responsive to a determination that there is no available PRACH resource for EDT on the selected carrier.

In one embodiment, the RA preamble is associated with EDT if the first EDT is not canceled. The RA preamble may be used and/or configured for EDT if the first EDT is not canceled.

In one embodiment, the RA preamble is not associated with EDT if the first EDT is canceled. The RA preamble may not be used and/or configured for EDT if the first EDT is canceled.

In one embodiment, the UE determines that there are one or more available PRACH resources for EDT on a carrier of the Cell (e.g., the SUL carrier and/or the NUL carrier) if an EDT-related configuration for the carrier is provided. For example, the UE may determine that there are one or more available PRACH resources for EDT on the carrier based on a determination that the EDT-related configuration for the carrier is provided. The EDT-related configuration may be provided by a network node.

In one embodiment, the EDT-related configuration for the carrier is provided in System Information of the Cell.

In one embodiment, the first EDT is used for transmitting uplink data in the RRC_INACTIVE state. For example, the first EDT is used for transmitting uplink data when the UE is in the RRC_INACTIVE state.

Referring back to FIGS. 3 and 4, in one exemplary embodiment of a UE, the device 300 includes a program code 312 stored in the memory 310. The CPU 308 could execute program code 312 to enable the UE (i) to initiate a first EDT in RRC_INACTIVE state, (ii) to initiate a RA procedure in a Cell configured with a NUL carrier and a SUL carrier responsive to initiating the first EDT, and (iii) to select the SUL carrier or the NUL carrier for performing the RA procedure based on whether there are one or more available PRACH resources for EDT on the SUL carrier and/or whether there are one or more available PRACH resources for EDT on the NUL carrier. Furthermore, the CPU 308 can execute the program code 312 to perform one, some and/or all of the above-described actions and steps and/or others described herein.

Figure 14:
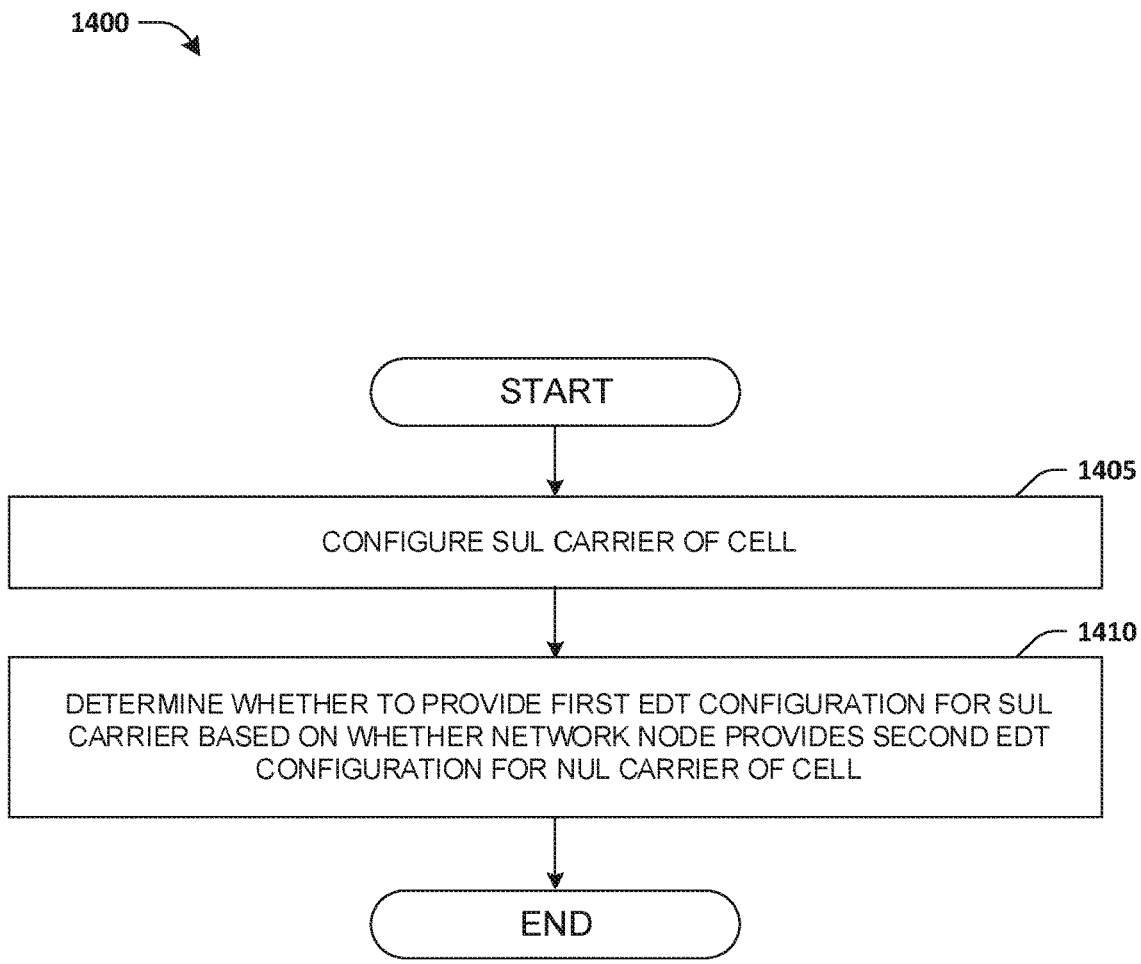
FIG. 14 is a flow chart according to one exemplary embodiment.

FIG. 14 is a flow chart 1400 according to one exemplary embodiment from the perspective of a network node controlling a Cell. In step 1405, the network node configures a SUL carrier of the Cell. In step 1410, the network node determines whether to provide a first EDT configuration for the SUL carrier based on whether the network node provides a second EDT configuration for a NUL carrier of the Cell.

In one embodiment, the network node provides the first EDT configuration for the SUL carrier if the network node provides the second EDT configuration for the NUL carrier.

In one embodiment, the network node does not provide the first EDT configuration for the SUL carrier if the network node does not provide the second EDT configuration for the NUL carrier.

In one embodiment, the network node indicates support of EDT via System Information of the Cell. For example, the System Information may comprise an indication that the network node supports EDT.

In one embodiment, the network node provides an EDT configuration via System Information of the Cell. For example, the first EDT configuration and/or the second EDT configuration may be provided via the System Information. Alternatively and/or additionally, the System Information may comprise the first EDT configuration and/or the second EDT configuration.

In one embodiment, the network node receives, from a UE, a RA preamble for EDT on the SUL carrier of the Cell if the network node provides the first EDT configuration. For example, the RA preamble may be received after and/or responsive to providing the first EDT configuration.

In one embodiment, the first EDT configuration comprises a set of RA preambles (e.g., a set of one or more RA preambles) for EDT for use on the SUL carrier of the Cell. For example, the set of RA preambles may be used for EDT on the SUL carrier.

In one embodiment, EDT is used for transmitting uplink data when a UE is in RRC_INACTIVE state.

Referring back to FIGS. 3 and 4, in one exemplary embodiment of a network node controlling a Cell, the device 300 includes a program code 312 stored in the memory 310. The CPU 308 could execute program code 312 to enable the network node (i) to configure a SUL carrier of the Cell, and (ii) to determine whether to provide a first EDT configuration for the SUL carrier based on whether the network node provides a second EDT configuration for a NUL carrier of the Cell. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 12-14. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 12-14, and/or one, some and/or all of the above-described actions and steps and/or others described herein.

It may be appreciated that applying one or more of the techniques presented herein may result in one or more benefits including, but not limited to, enabling a UE, such as a NR_Lite UE, to determine whether to cancel EDT based on whether there are one or more available PRACH resources for EDT during a RA procedure.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), the method comprising:
    selecting a carrier, comprising a normal uplink (NUL) carrier or a supplementary uplink (SUL) carrier, based on whether a Reference Signal Received Power (RSRP) of a downlink pathloss reference is less than a threshold;
    after selecting the carrier, determining whether there are one or more available Physical Random Access Channel (PRACH) resources for early data transmission (EDT) available to the UE on the carrier; and
    performing or not performing a first EDT based on whether there are one or more PRACH resources for EDT available to the UE on the carrier.

2. The method of claim 1, wherein:
    the UE cancels or does not perform the first EDT if the carrier is not configured with one or more PRACH resources for EDT.

3. The method of claim 1, wherein:
    the UE performs or does not cancel the first EDT if the carrier is configured with one or more PRACH resources for EDT.

4. The method of claim 1, wherein:
    the UE cancels or does not perform the first EDT if the carrier is the SUL carrier and the SUL carrier is not configured with one or more PRACH resources for EDT.

5. The method of claim 1, wherein:
    the UE performs or does not cancel the first EDT if the carrier is the SUL carrier and the SUL carrier is configured with one or more PRACH resources for EDT.

6. The method of claim 1, wherein:
    the UE cancels or does not perform EDT if the carrier is the NUL carrier and the NUL carrier is not configured with one or more PRACH resources for EDT.

7. The method of claim 1, wherein:
    the UE performs or does not cancel the first EDT if the carrier is the NUL carrier and the NUL carrier is configured with one or more PRACH resources for EDT.

8. The method of claim 1, further comprising:
    receiving an indication of support of EDT from a network node.

9. The method of claim 1, further comprising:
    requesting connection resumption for EDT via one or more upper layers.

10. The method of claim 1, further comprising:
    receiving a configuration related to EDT in system information.

11. The method of claim 1, wherein:
    the UE determines whether there are one or more PRACH resources for EDT during random access resource selection.

12. A User Equipment (UE), comprising:
    a control circuit;
    a processor installed in the control circuit; and
    a memory installed in the control circuit and operatively coupled to the processor, wherein the processor is configured to execute a program code stored in the memory to perform operations, the operations comprising:
        selecting a carrier, comprising a normal uplink (NUL) carrier or a supplementary uplink (SUL) carrier, based on whether a Reference Signal Received Power (RSRP) of a downlink pathloss reference is less than a threshold;
        after selecting the carrier, determining whether there are one or more Physical Random Access Channel (PRACH) resources for early data transmission (EDT) available to the UE on the carrier; and
        performing or not performing a first EDT based on whether there are one or more PRACH resources for EDT available to the UE on the carrier.

13. The UE of claim 12, wherein:
    the UE cancels or does not perform the first EDT if the carrier is not configured with one or more PRACH resources for EDT.

14. The UE of claim 12, wherein:
    the UE performs or does not cancel the first EDT if the carrier is configured with one or more PRACH resources for EDT.

15. The UE of claim 12, wherein:
    the UE cancels or does not perform the first EDT if the carrier is the SUL carrier and the SUL carrier is not configured with one or more PRACH resources for EDT.

16. The UE of claim 12, wherein:
    the UE performs or does not cancel the first EDT if the carrier is the SUL carrier and the SUL carrier is configured with one or more PRACH resources for EDT.

17. The UE of claim 12, wherein:
    the UE cancels or does not perform EDT if the carrier is the NUL carrier and the NUL carrier is not configured with one or more PRACH resources for EDT.

18. The UE of claim 12, wherein:
    the UE performs or does not cancel the first EDT if the carrier is the NUL carrier and the NUL carrier is configured with one or more PRACH resources for EDT.

19. The UE of claim 12, the operations further comprising:
    receiving an indication of support of EDT from a network node.

20. The UE of claim 12, the operations further comprising:
    requesting connection resumption for EDT via one or more upper layers.

21. The UE of claim 12, the operations further comprising:
    receiving a configuration related to EDT in system information.

22. The UE of claim 12, wherein:
    the UE determines whether there are one or more PRACH resources for EDT during random access resource selection.

* * * * *